United States Patent [19]
Land

[11] 3,800,306
[45] Mar. 26, 1974

[54] METHOD OF OPERATING A FILM HANDLING CASSETTE

[75] Inventor: Edwin H. Land, Cambridge, Mass.

[73] Assignee: Polaroid Corporation, Cambridge, Mass.

[22] Filed: Jan. 31, 1973

[21] Appl. No.: 328,482

Related U.S. Application Data

[62] Division of Ser. No. 227,080, Feb. 17, 1972.

[52] U.S. Cl............... 95/13, 352/130, 352/78
[51] Int. Cl............................................. G03c 11/00
[58] Field of Search............ 352/130, 72, 78; 95/13, 95/19

[56] References Cited
UNITED STATES PATENTS
3,667,361  6/1972  Meggs.................................... 95/13
3,584,944  6/1971  Cook................................. 352/130

Primary Examiner—Monroe H. Hayes

[57] ABSTRACT

A photographic system, comprising a film cassette containing a strip of film, a supply of processing composition, and a processor programmed to apply the processing composition to the film upon manipulation of the film in the cassette; and a film drive and projection system adapted to receive the cassette, and containing cyclic drive apparatus responsive to the insertion of a cassette and to a signal produced by the cassette indicating whether or not the film has been processed for manipulating the film, to cause processing if the film has not been processed, and then to project it; or simply to project the film, if it has been processed.

14 Claims, 47 Drawing Figures

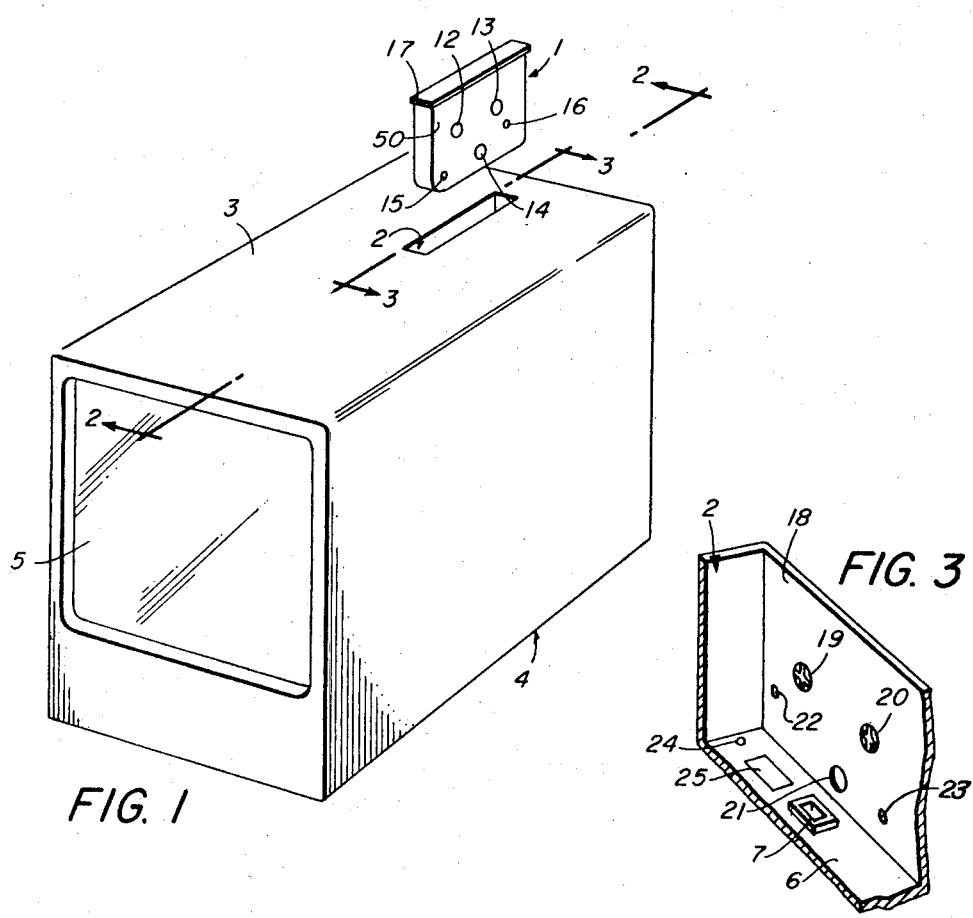
FIG. 1
FIG. 3
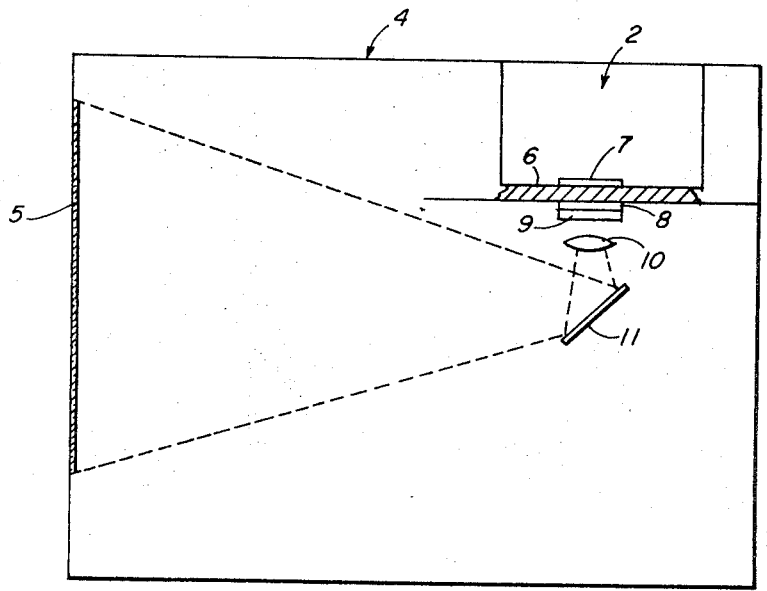
FIG. 2

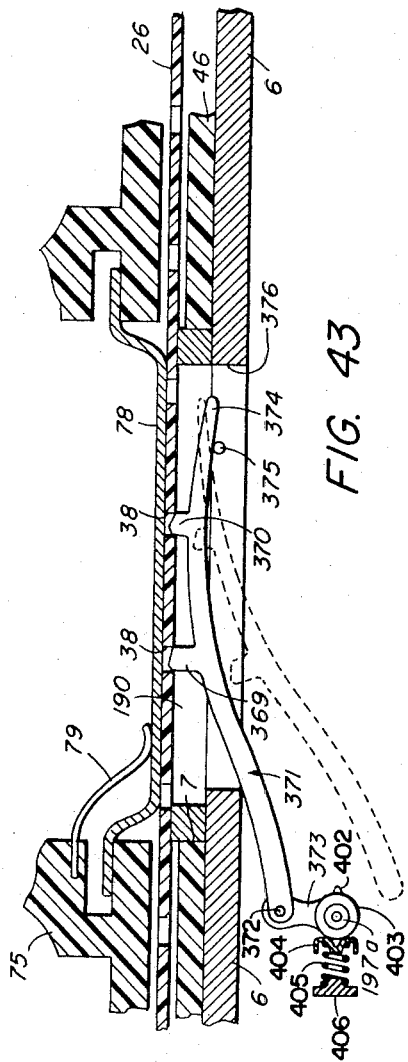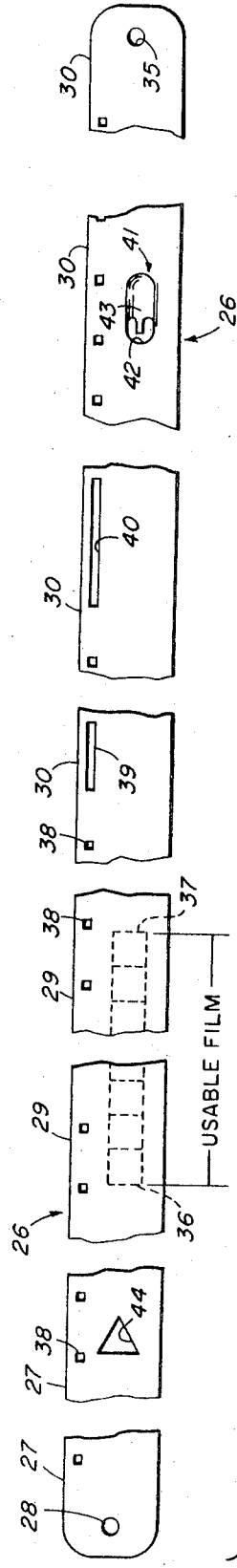

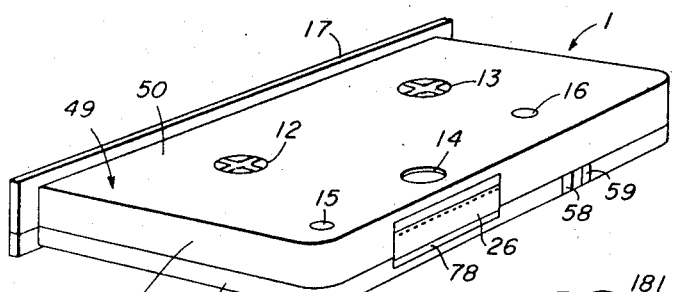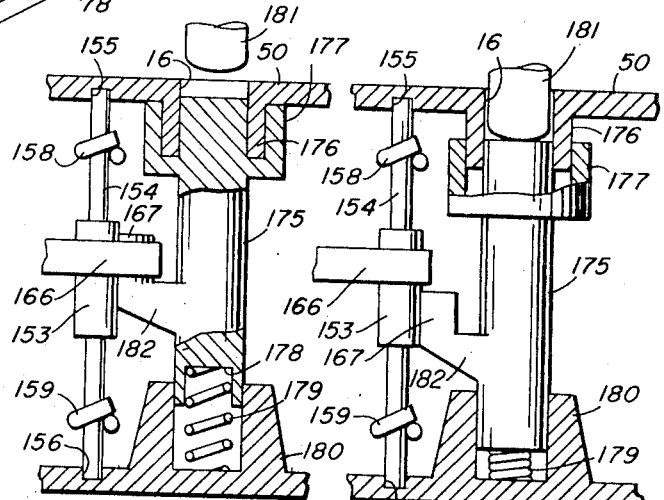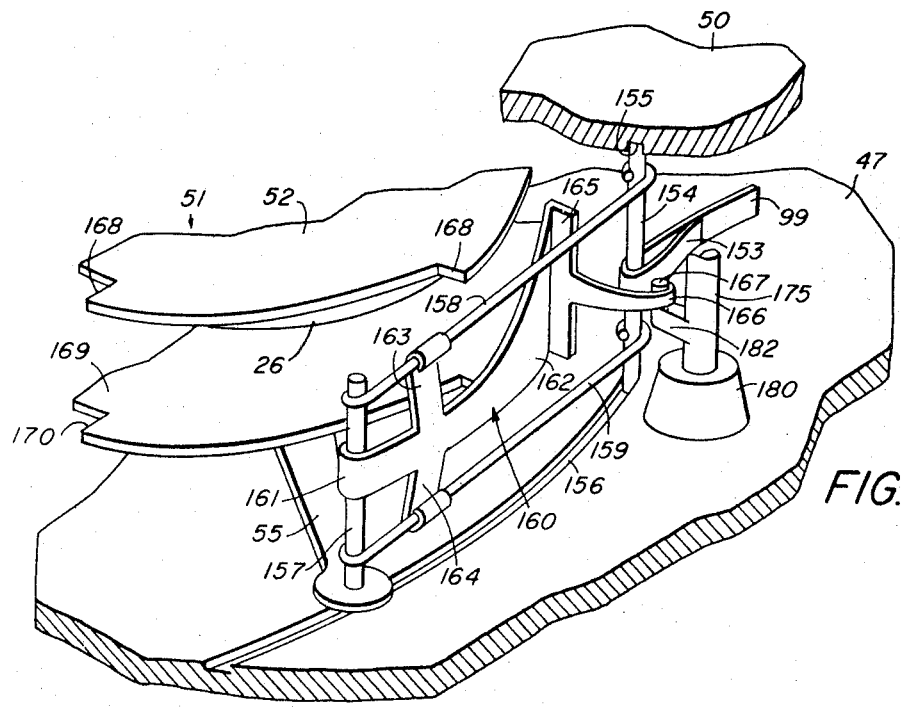

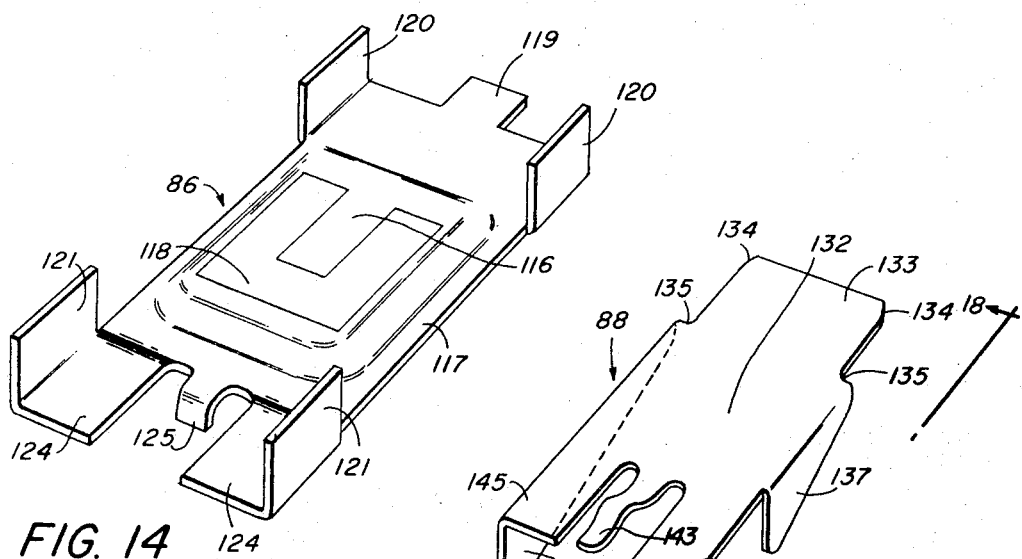
FIG. 14
FIG. 17
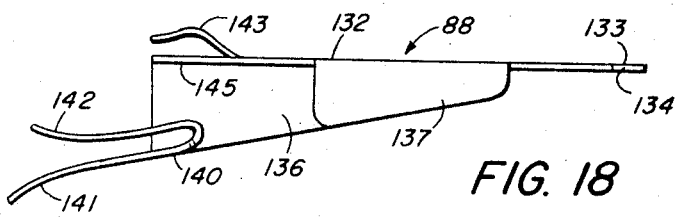
FIG. 18
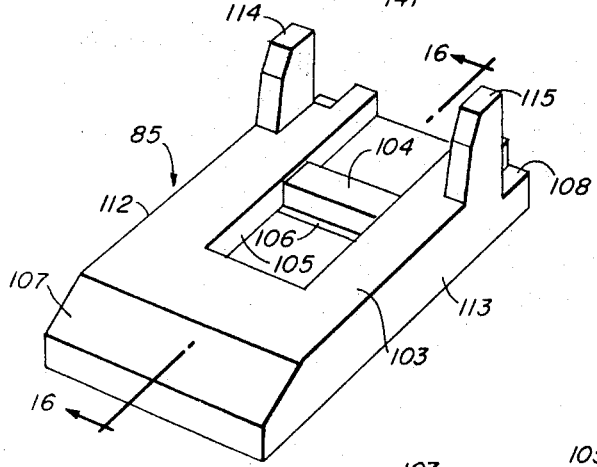
FIG. 15
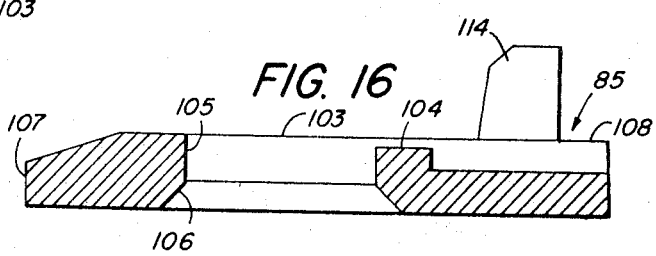
FIG. 16

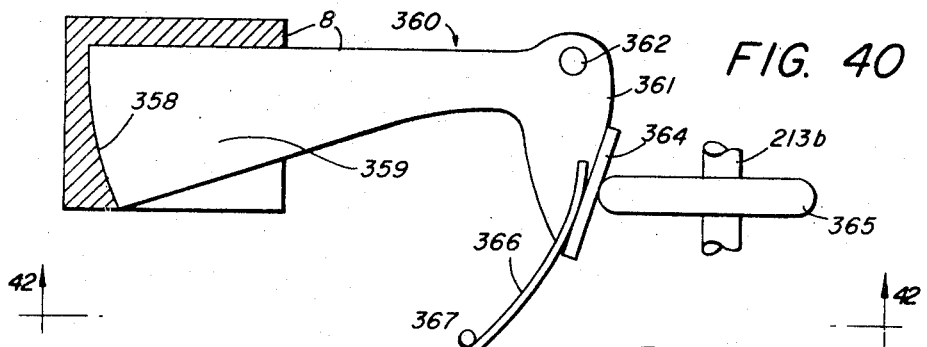
FIG. 40
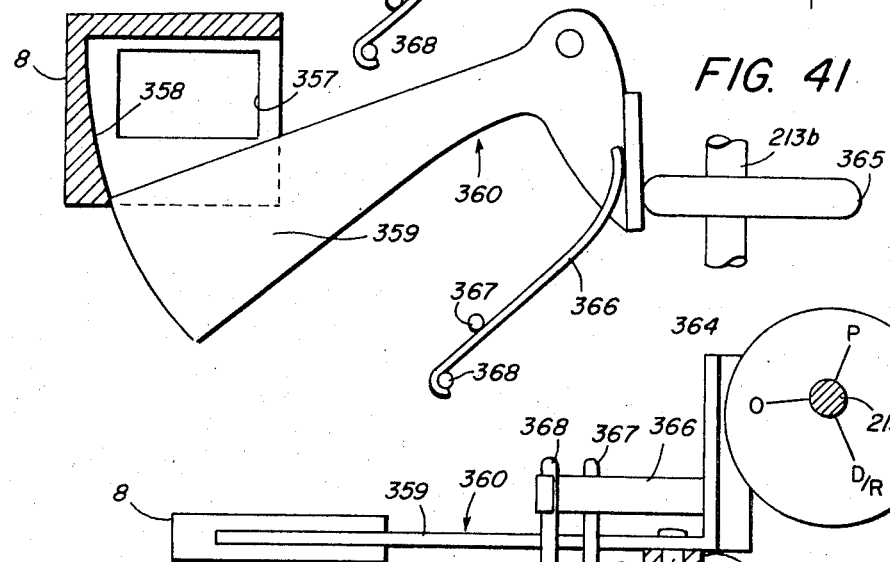
FIG. 41
FIG. 42
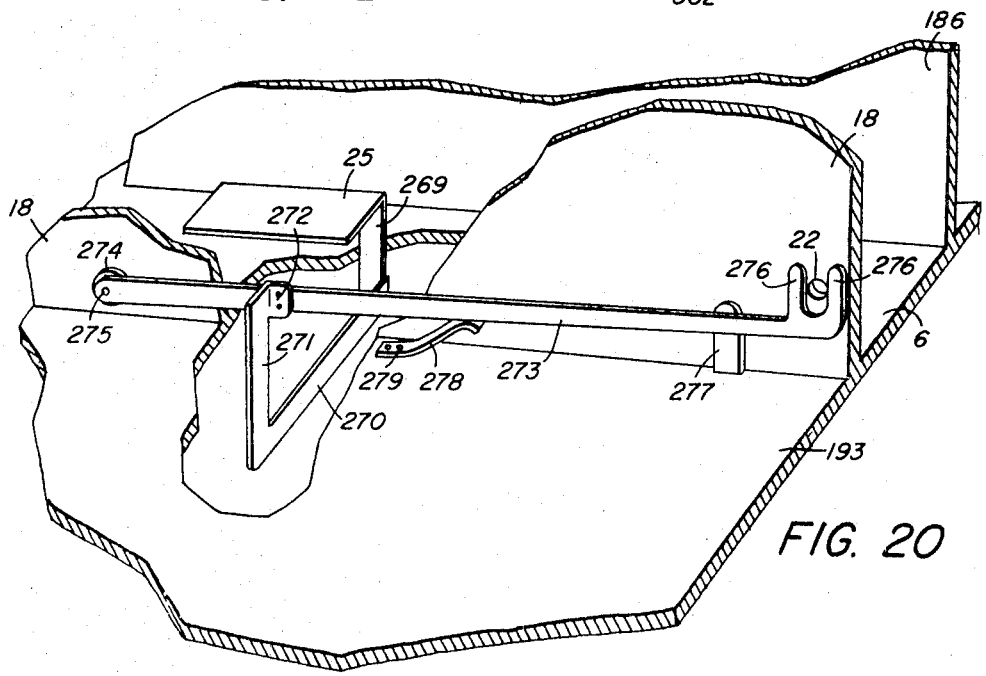
FIG. 20

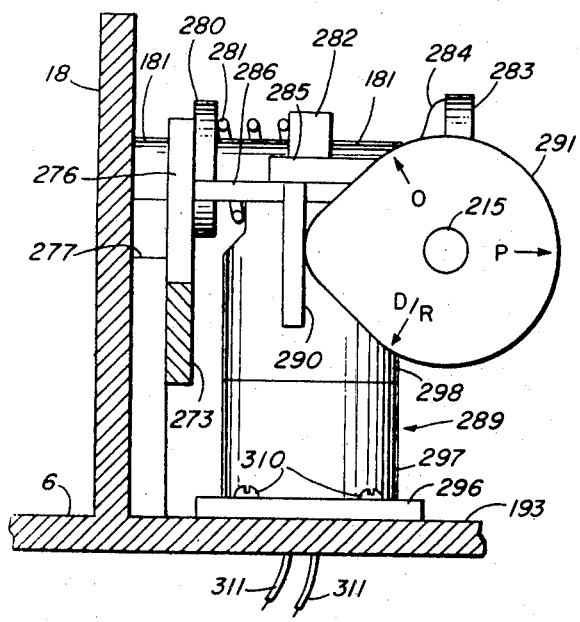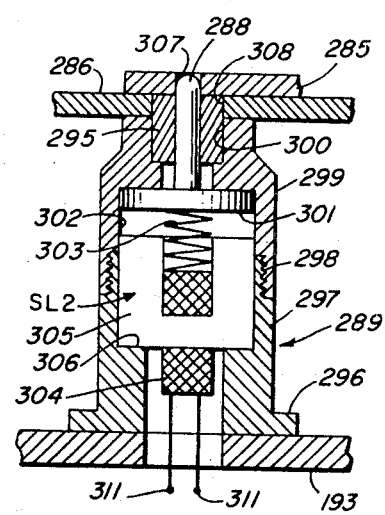
FIG. 24  FIG. 25
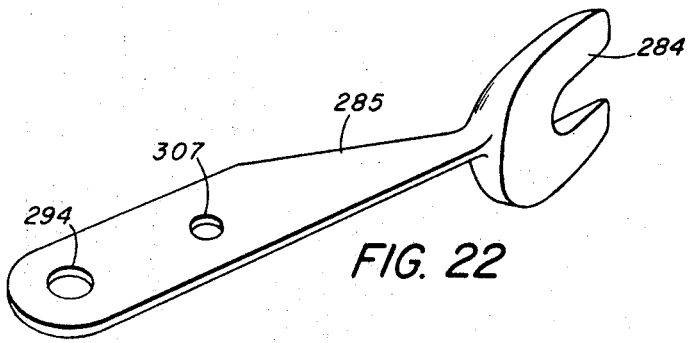
FIG. 22
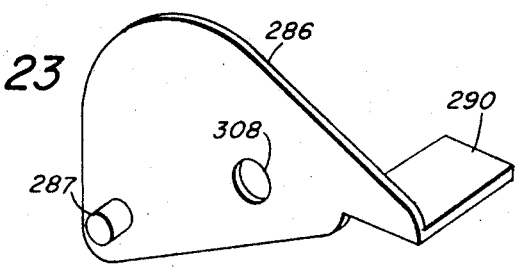
FIG. 23

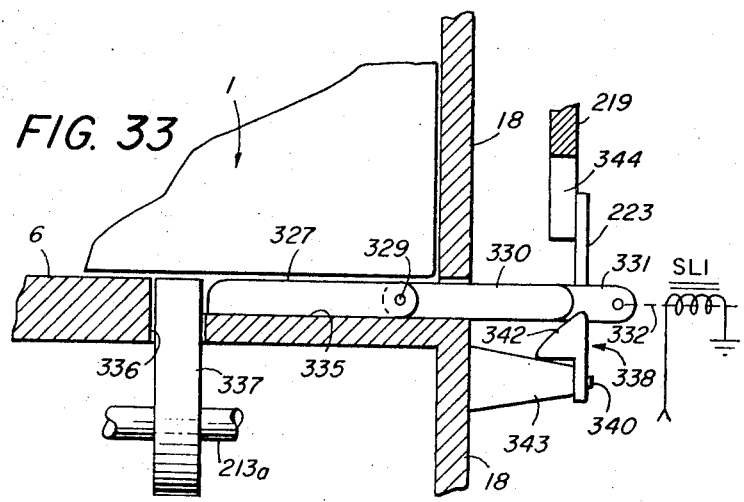
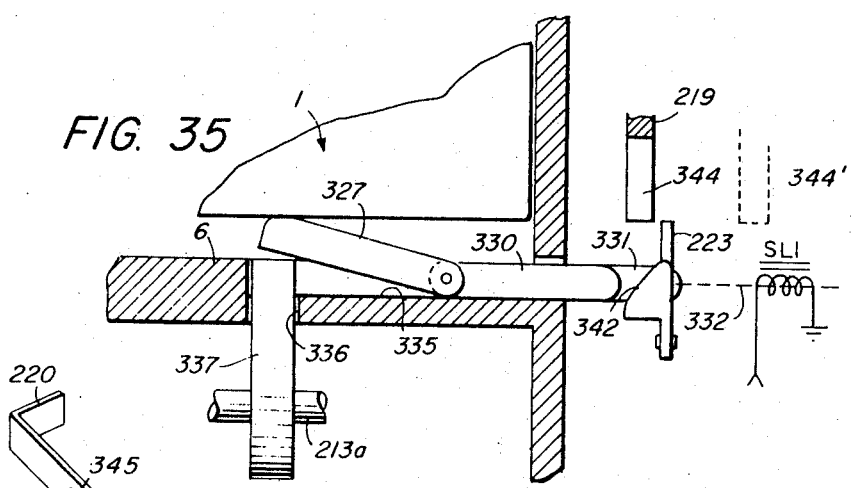
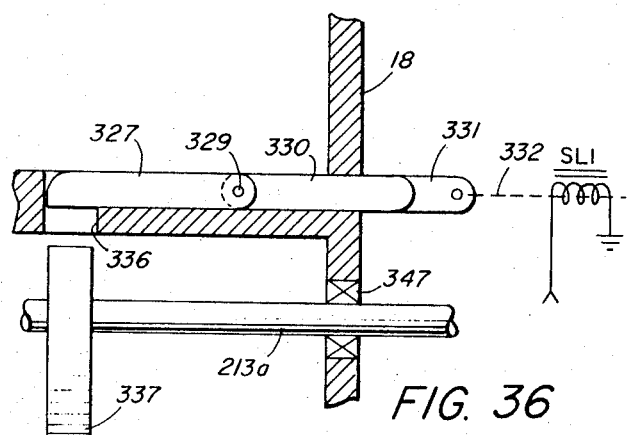
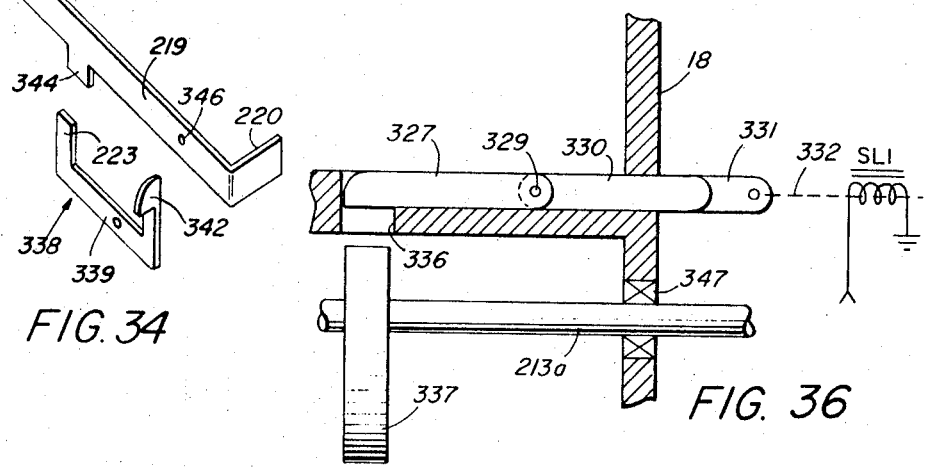

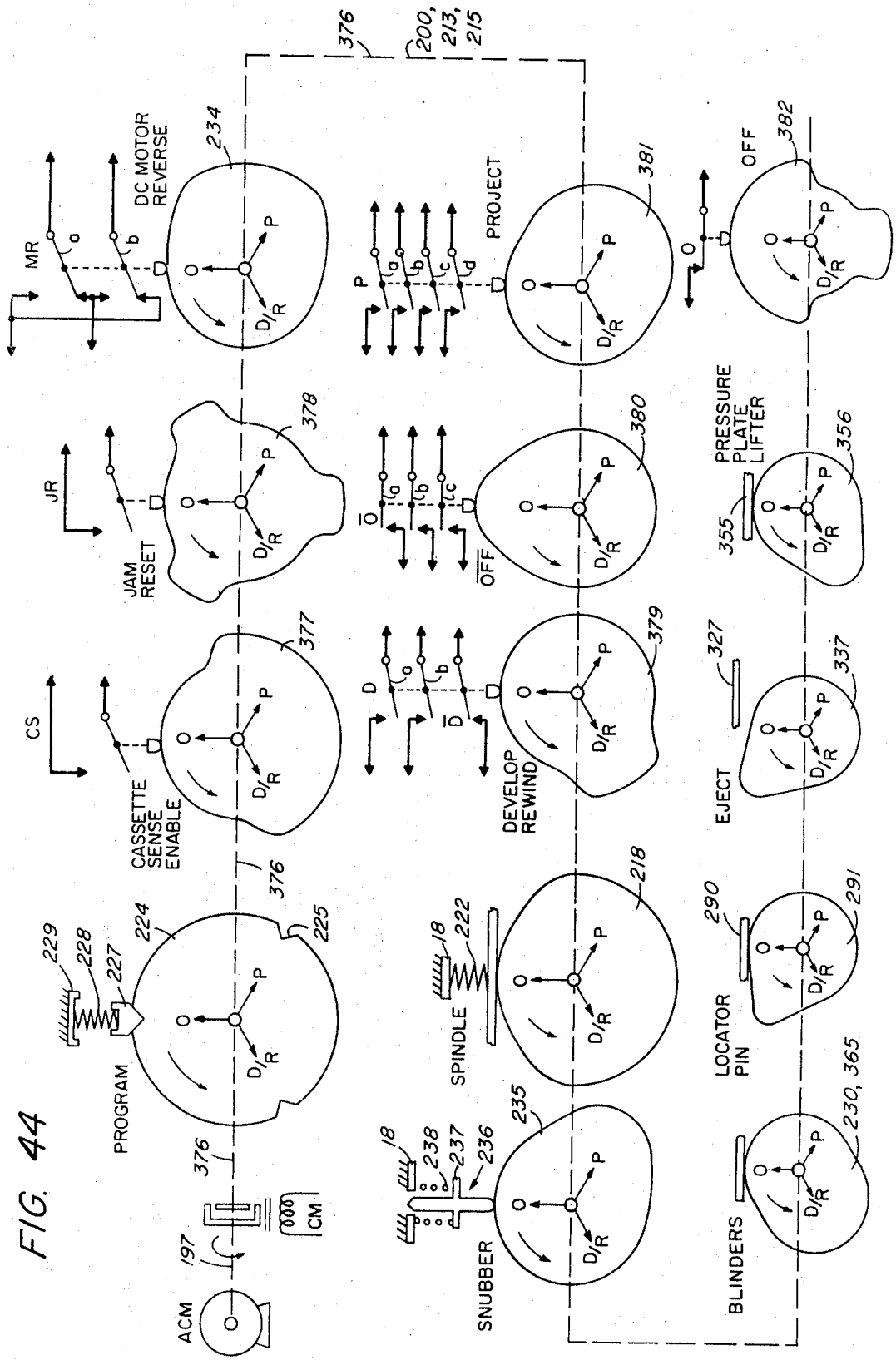

METHOD OF OPERATING A FILM HANDLING CASSETTE

This application is a division of my copending U. S. application Ser. No. 227,080, filed on Feb. 17, 1972 for Photographic System for Processing and Projecting Transparencies.

This invention relates to photography, and particularly to a novel system for processing and projecting transparencies.

A widely accepted advance in the photographic art has been the creation of photographic systems in which photosensitive material is packaged with processing composition so that photographs may be produced without the aid of a darkroom immediately after the production of a latent image in the camera. It would be highly desirable to extend this facility to the production of projection transparencies, as for motion pictures and the like. It is the object of this invention to facilitate the production of projection transparencies without the aid of a darkroom, and to enable such images to be projected within minutes after their production in latent form.

The above and other objects of the invention are attained by a novel photographic system which comprises as the key element a replaceable film cassette. The cassette contains a strip of film, a supply of processing composition for the film, and an internally programmed processor responsive to the manipulation of the film in the cassette for applying the processing composition to the film after its exposure.

The cassette is adapted to be inserted in a camera, for exposure of the film. After exposure, it is inserted into a film drive and projection system. This system comprises a receptacle configured to receive the cassette, and cyclic drive apparatus for manipulating the film in the cassette. The film is manipulated in a sequence determined by a signal provided by the cassette that indicates whether or not the film has been processed.

In response to the insertion of a cassette containing unprocessed film, the film drive and projection apparatus manipulates the film in the cassette in a lighttight environment. That movement of the film activates the processor, developing the film to produce a series of fixed, visible, projectable images. Thereafter, the apparatus manipulates the film in an optical system, causing it to be projected for viewing. Finally, the film is rewound, for storage and subsequent reuse. In response to the insertion of a cassette containing processed film, the system simply projects the film, and then rewinds it.

More specifically, the cassette comprises a lighttight housing containing a pair of storage reels on which a strip of film is disposed, extending from one reel to the other over a path including a film gate in the housing through which a portion of the film is exposed for cooperation with a camera, and with the film drive and projection system. The film is initially unexposed, and coiled primarily about one of the reels hereinafter referred to as the supply reel. The other reel, to be referred to as the takeup reel, is connected to one end of the film and adapted to store the film as it is advanced from the supply reel during exposure, or during subsequent manipulations in the film drive and projection system.

The cassette contains a processing system that is initially latched into an inactive state by a detent that is released when the cassette is inserted in the film drive and projection system. A singularity is provided on the film, preferably comprising a hook formed adjacent an aperture in the film near the end connected to the supply reel. In response to movement of the film toward the takeup reel beyond an exposure termination point established in the camera, the hook engages and releases a pressure pad that then resiliently urges the film into contact with a coating nozzle.

The film is provided, along at least one edge, with conventional sprocket holes to enable the film to be incrementally advanced onto the supply reel during exposure or projection. In accordance with the invention, the series of sprocket holes is interrupted at a first point by a first elongated sprocket hole that serves to terminate advance of the film in the camera. A second sprocket hole is provided, of greater length than the first, which serves a similar purpose in the film drive and projection system by terminating advance of the film at a point beyond the exposure termination point established in the camera. When the film has been advanced in the film drive and projection system to the second termination point established by the second elongated sprocket hole, it is then rewound.

A pair of contacts on the cassette produce a signal, in a manner to be described, that indicates whether or not the film has been processed. This signal is sensed by the film drive and projection system when the cassette is inserted into it. If the film has not been processed, rewinding takes place in three stages. As the first step, a short length of film is drawn onto the supply reel, causing rotation of the supply reel in the rewind sense for the first time since the manufacture of the cassette. Rotation of the supply reel in that sense activates a release mechanism, enabled by the insertion of a cassette in the film drive and projection system, to release the processing composition in preparation for developing the film.

A short interval of time is then allowed to elapse during which the film is motionless. That allows the processing composition to find its way into the coating nozzle. Thereafter, the film is rewound onto the supply reel continuously, at constant linear speed relative to the coating nozzle, while the processing composition is applied to it in a thin, uniform coat. Towards the end of this process, as the film nears its end on the takeup reel, another singularity in the film, which may take the form of an aperture in the film near the end connected to the takeup reel, engages the processor and causes the pressure plate to be cammed out of engagement with the film and into a latched storage position, while closing the coating nozzle aperture.

The film drive and projection system includes a drive mechanism coupled to the supply and takeup reels through slip clutches. As the end of the film is reached on the takeup reel, these shafts slip, and this cessation of motion is sensed to cause the drive system to advance to a projection mode of operation.

In that mode, a snubber reel in the cassette is engaged to prevent motion of the film onto the takeup reel except as it is incrementally advanced by a drive pawl that sequentially engages the sprockets in the edge of the film. A projection lamp is turned on, and directs light through the film through a lens that focuses an image of the developed images onto a screen provided as part of the projection system. The finished film is thus projected for viewing within approximately a minute after the insertion of the exposed film into the film drive and projection system.

At the end of the projection cycle, the film is rapidly rewound onto the supply reel. The cassette is then automatically ejected. Had the film in the cassette been processed prior to its last insertion in the system, operation would commence with projection of the film, and conclude by rewinding the projected film onto the supply reel, and ejecting the cassette as before.

The system of the invention, the manner in which its components are constructed, and their mode of operation, will best be understood in the light of the following description, together with the accompanying drawings, of a preferred embodiment thereof.

In the drawings,

FIG. 1 is a schematic perspective sketch of a film cassette shown in association with a film drive and projection system in accordance with the invention;

FIG. 2 is a schematic elevational view, with parts shown in cross section and parts broken away, of the film drive and projection system of FIG. 1, taken substantially along the lines 2—2 in FIG. 1;

FIG. 3 is a schematic fragmentary perspective sketch of a portion of a cassette receiving receptacle in the film drive and projection system of FIG. 1, taken substantially along the lines 3—3 in FIG. 1;

FIG. 4 is a fragmentary schematic plan sketch, with parts broken away, of a film strip forming a part of the cassette of FIG. 1;

FIG. 6 is a schematic perspective sketch of a cassette in accordance with the invention;

FIG. 7 is a fragmentary schematic perspective sketch, with parts broken away and parts shown in cross section, of a portion of a composition release mechanism forming a part of the apparatus of FIG. 5;

Figure 5:
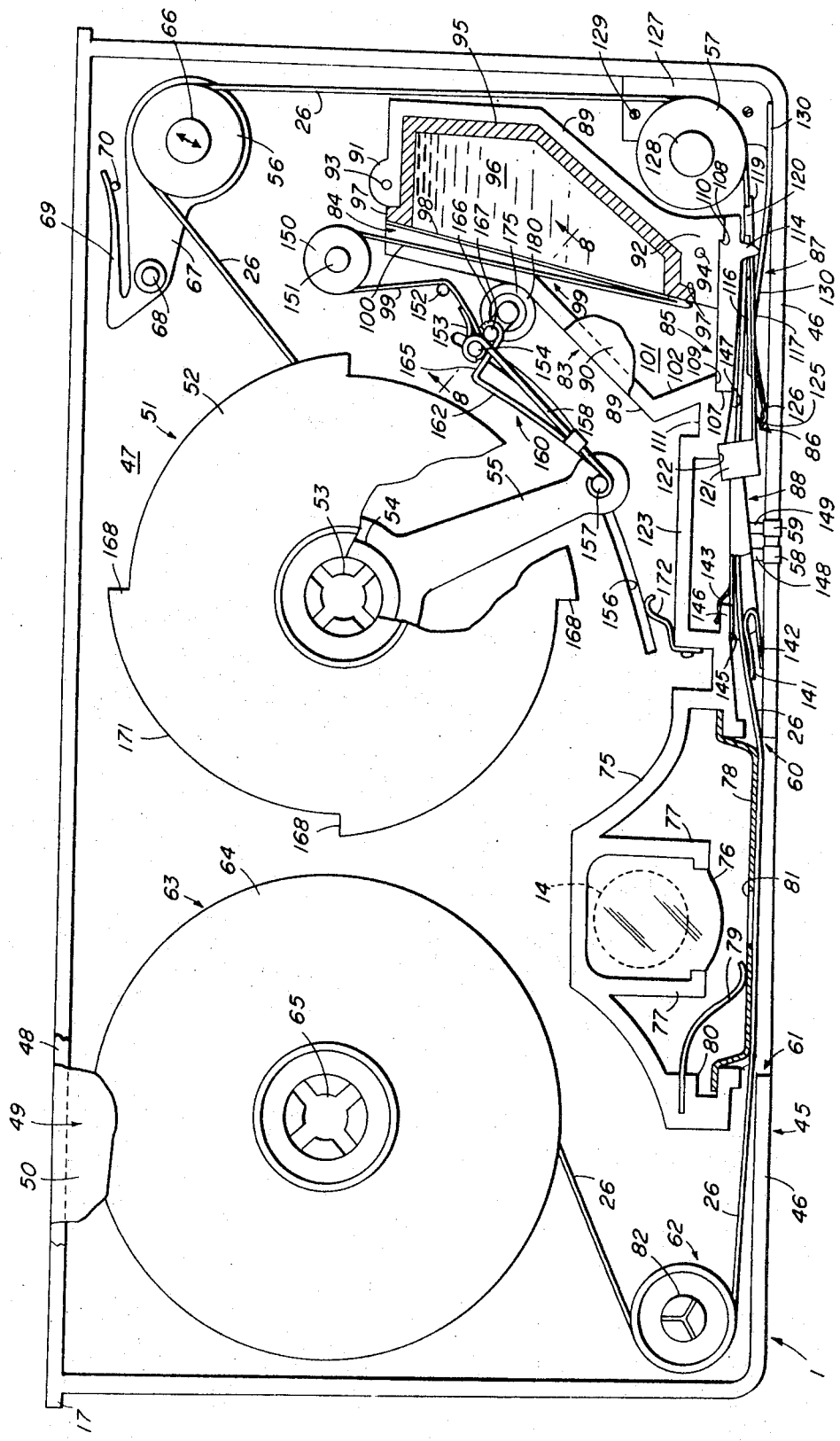
FIG. 5 is a schematic plan sketch, with parts omitted, parts shown in cross section, and parts broken away, of a film cassette in accordance with the invention.
Figure 10:
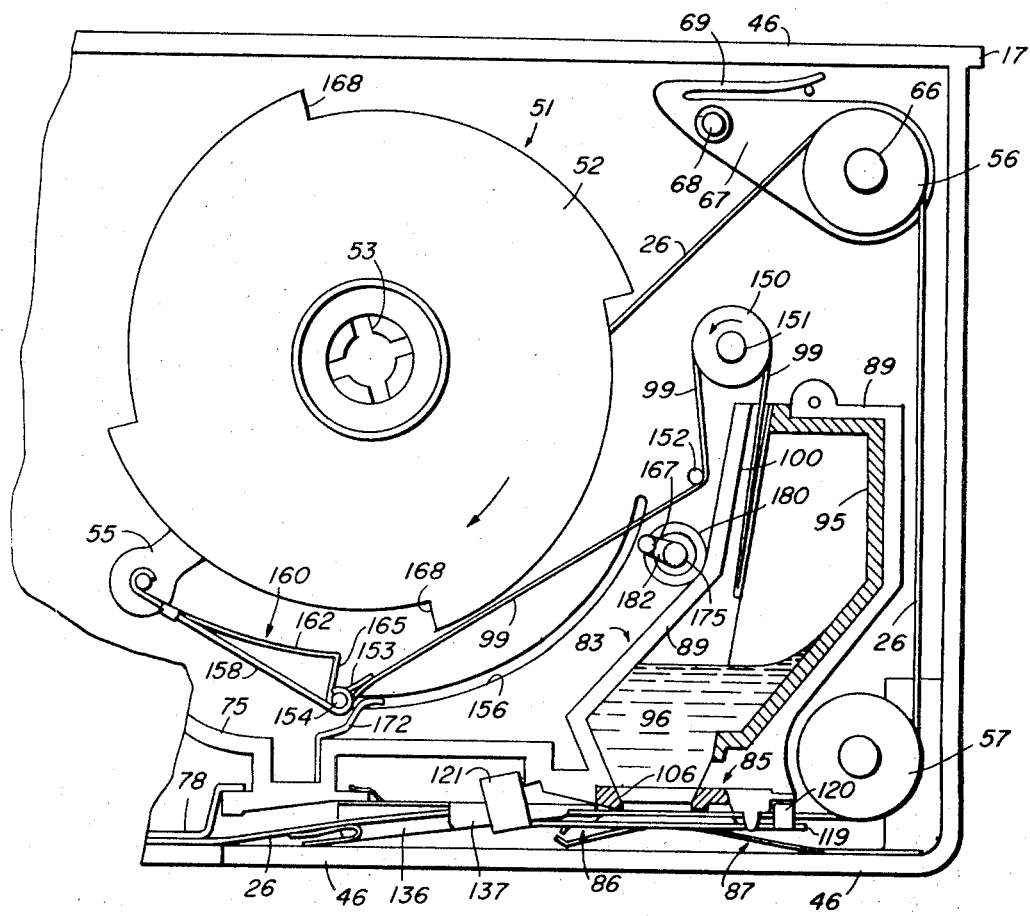
Figure 11:
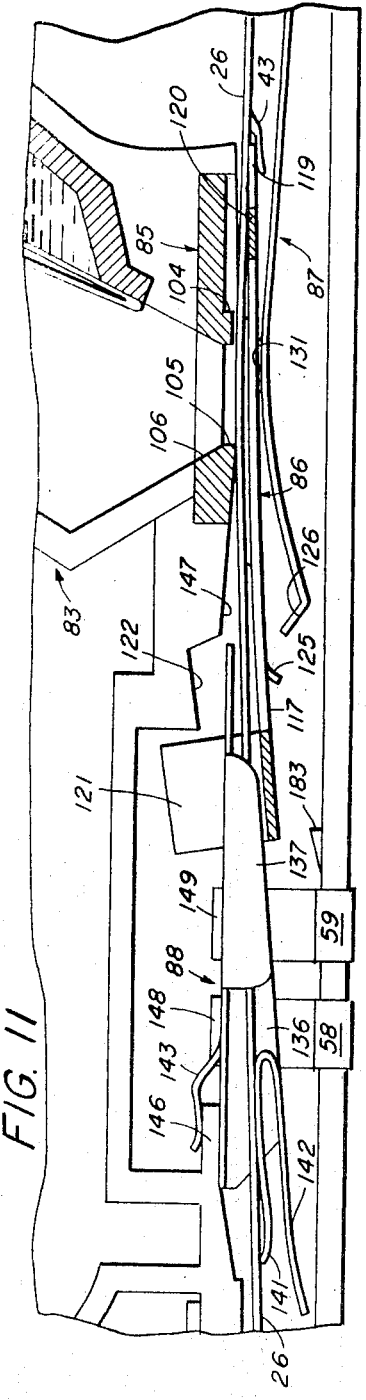
Figure 12:
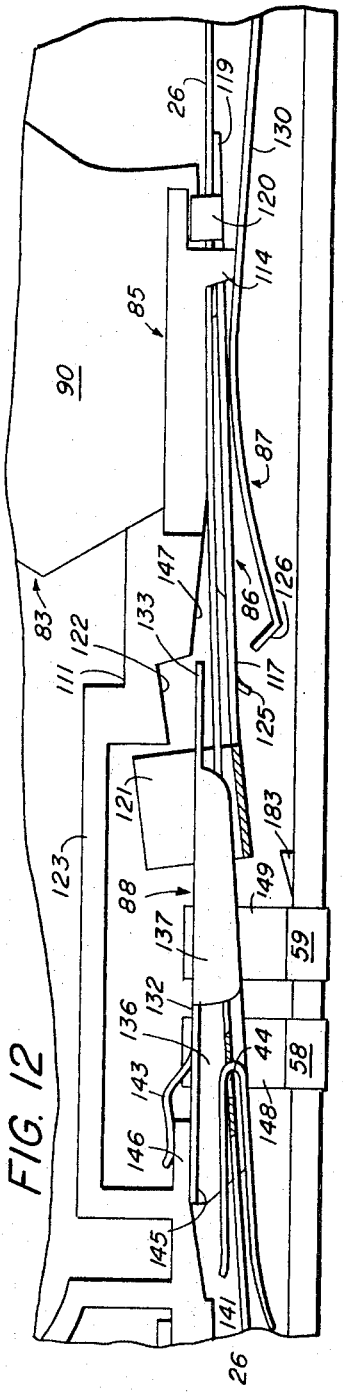
Figure 13:
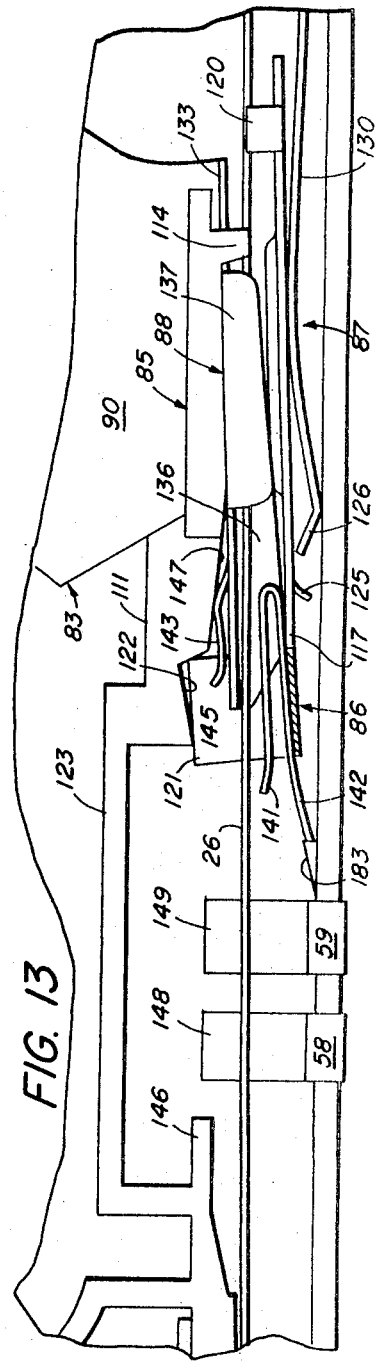
Figure 19:
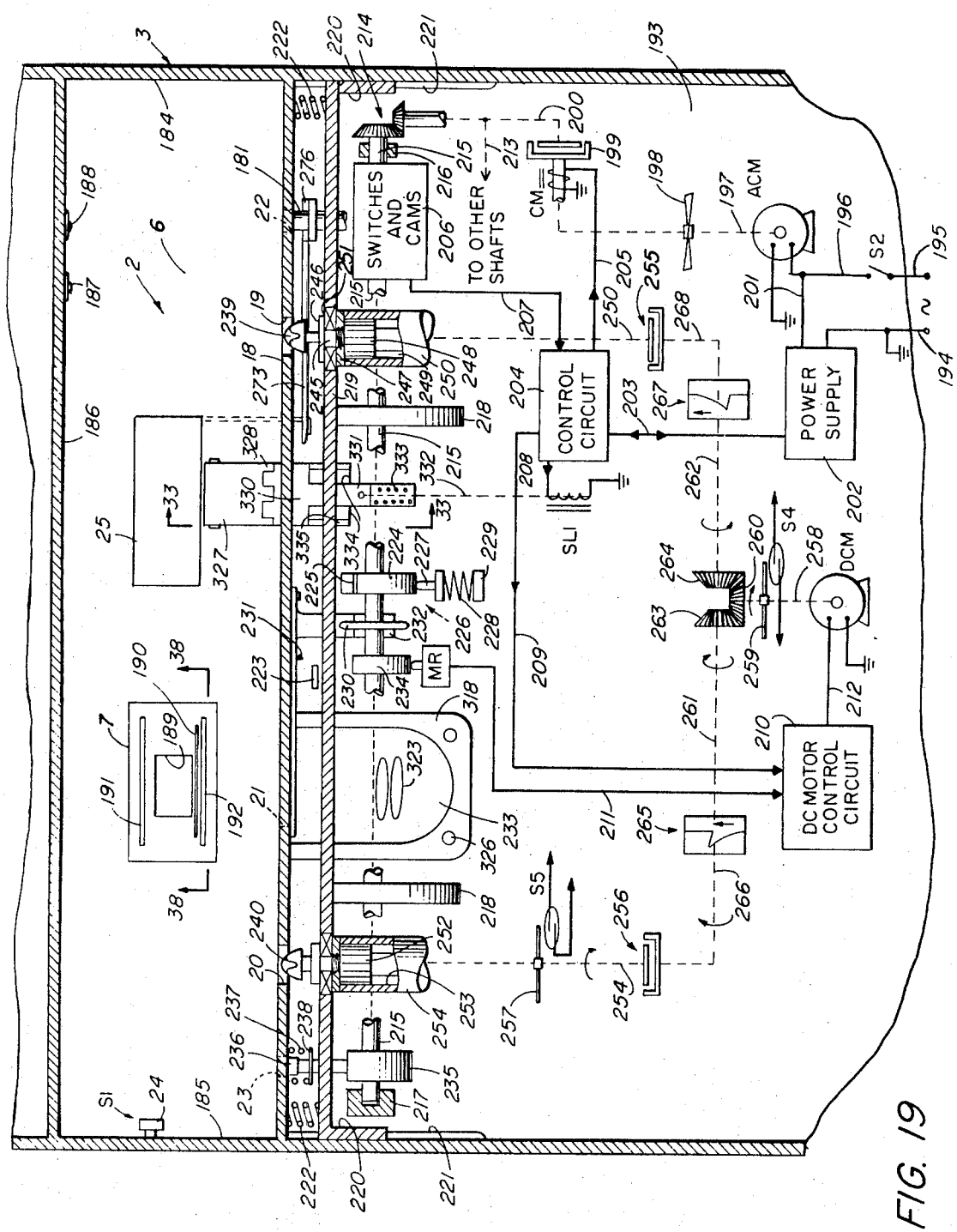
Figure 21:
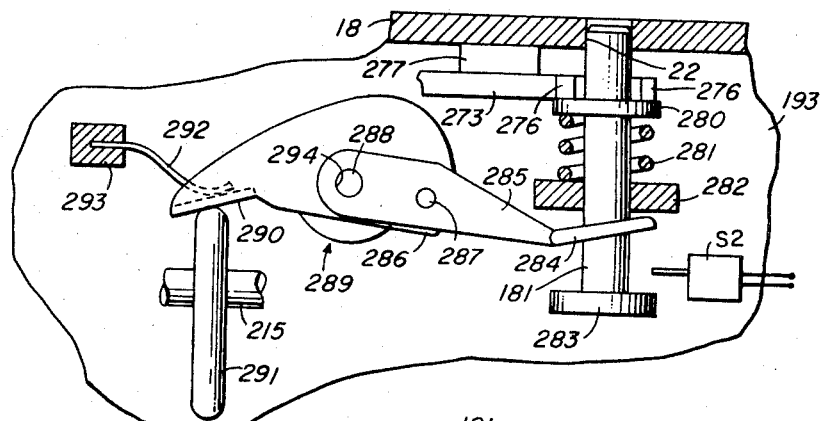
Figure 26:
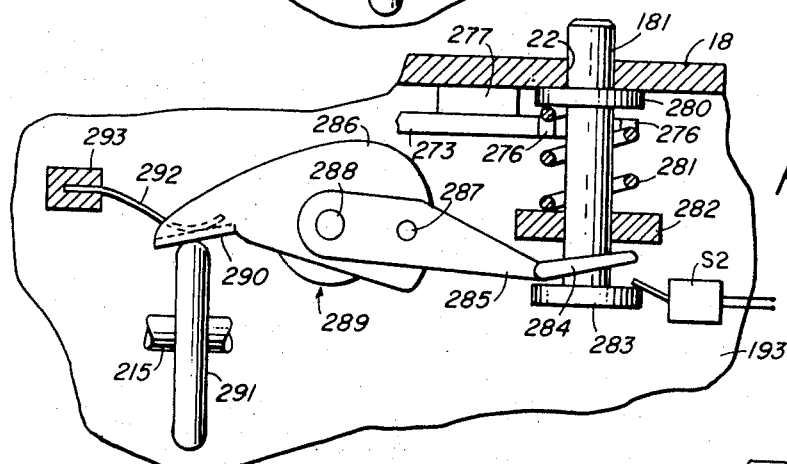
Figure 27:
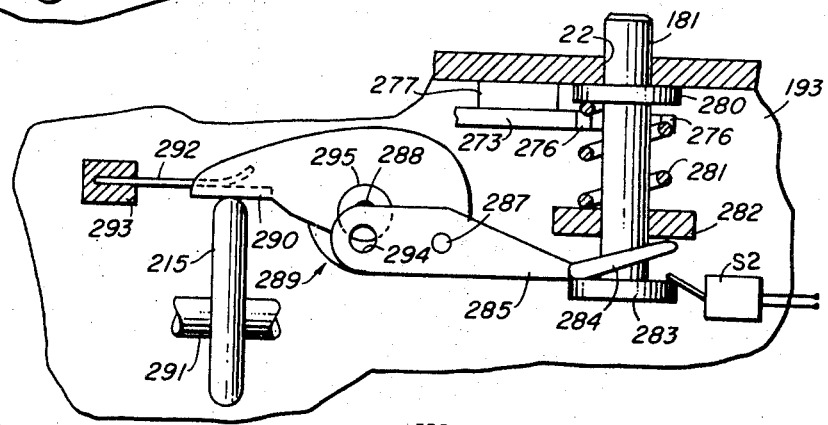
Figure 28:
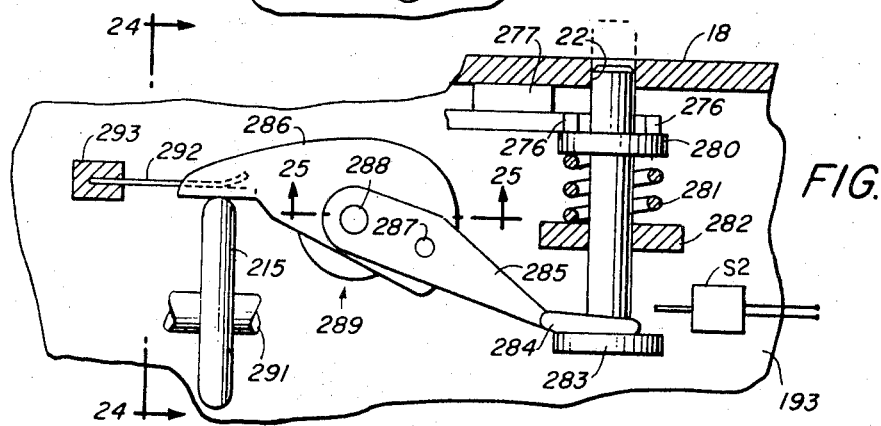
Figure 31:
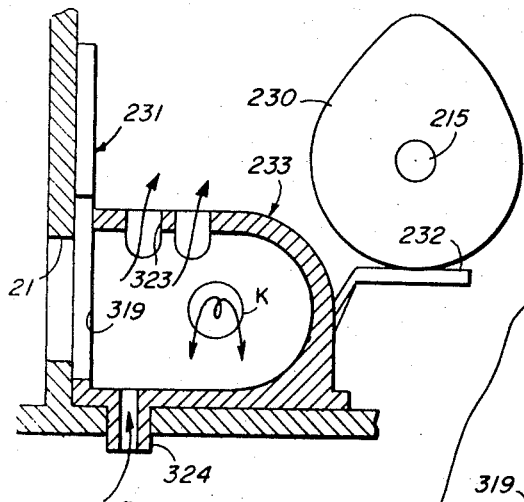
Figure 29:
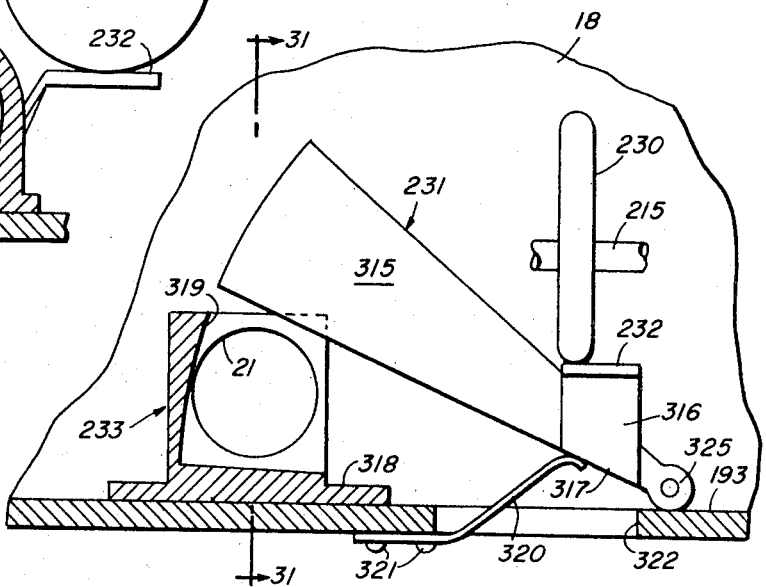
Figure 30:
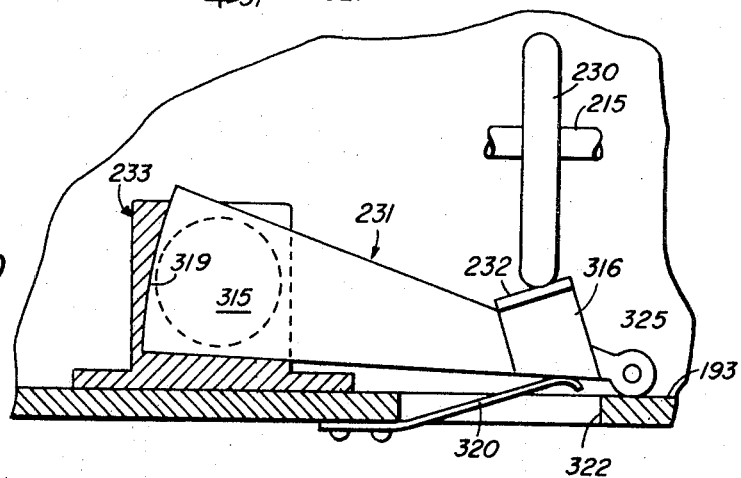
Figure 32:
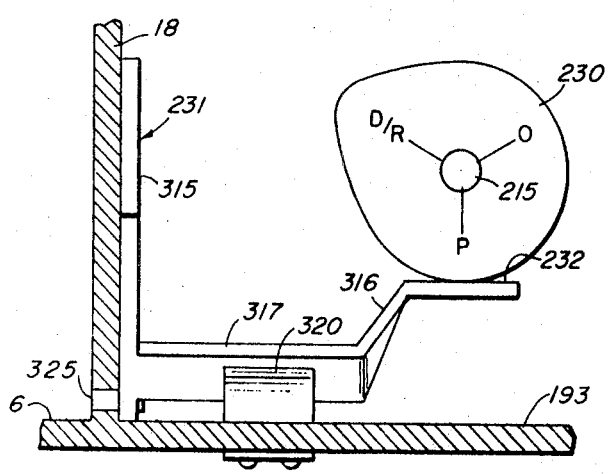
Figure 37:
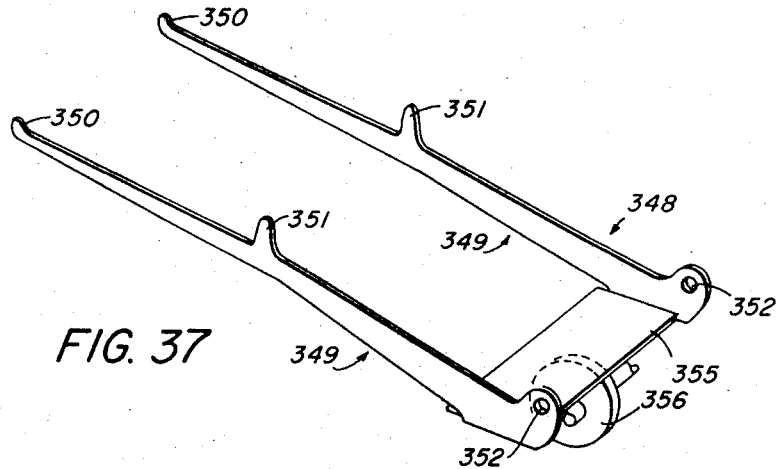
Figure 38:
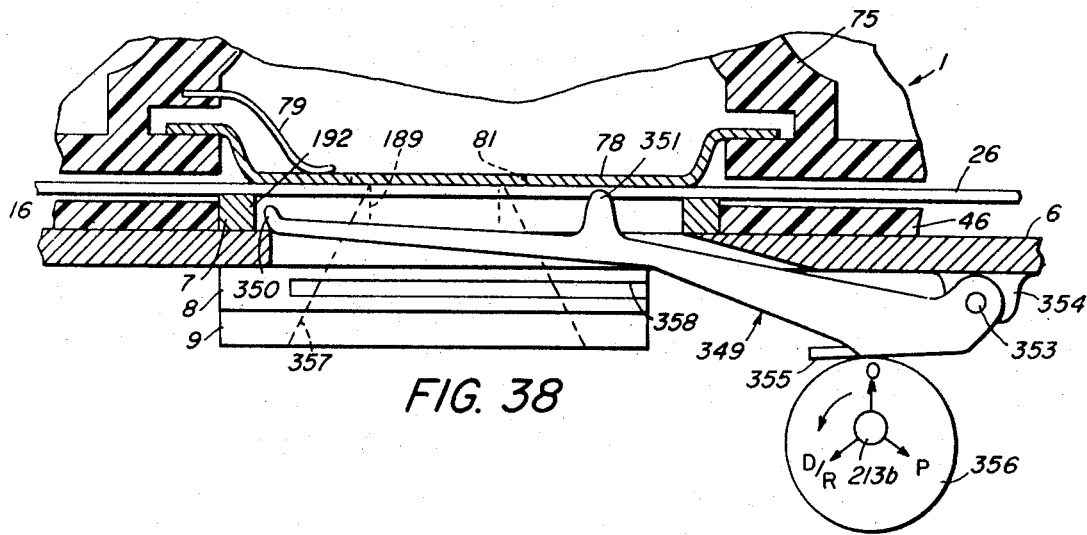
Figure 39:
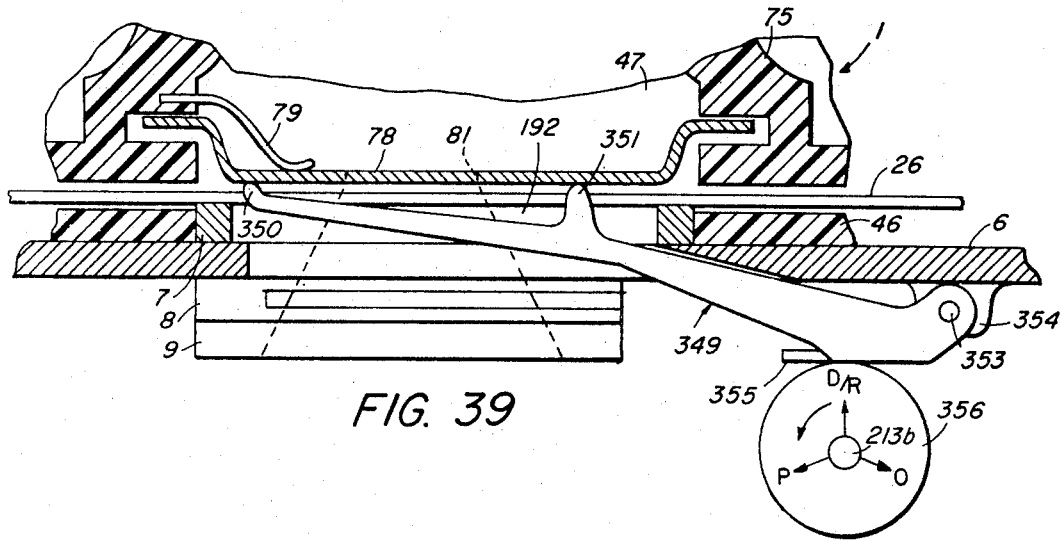
Figure 45:
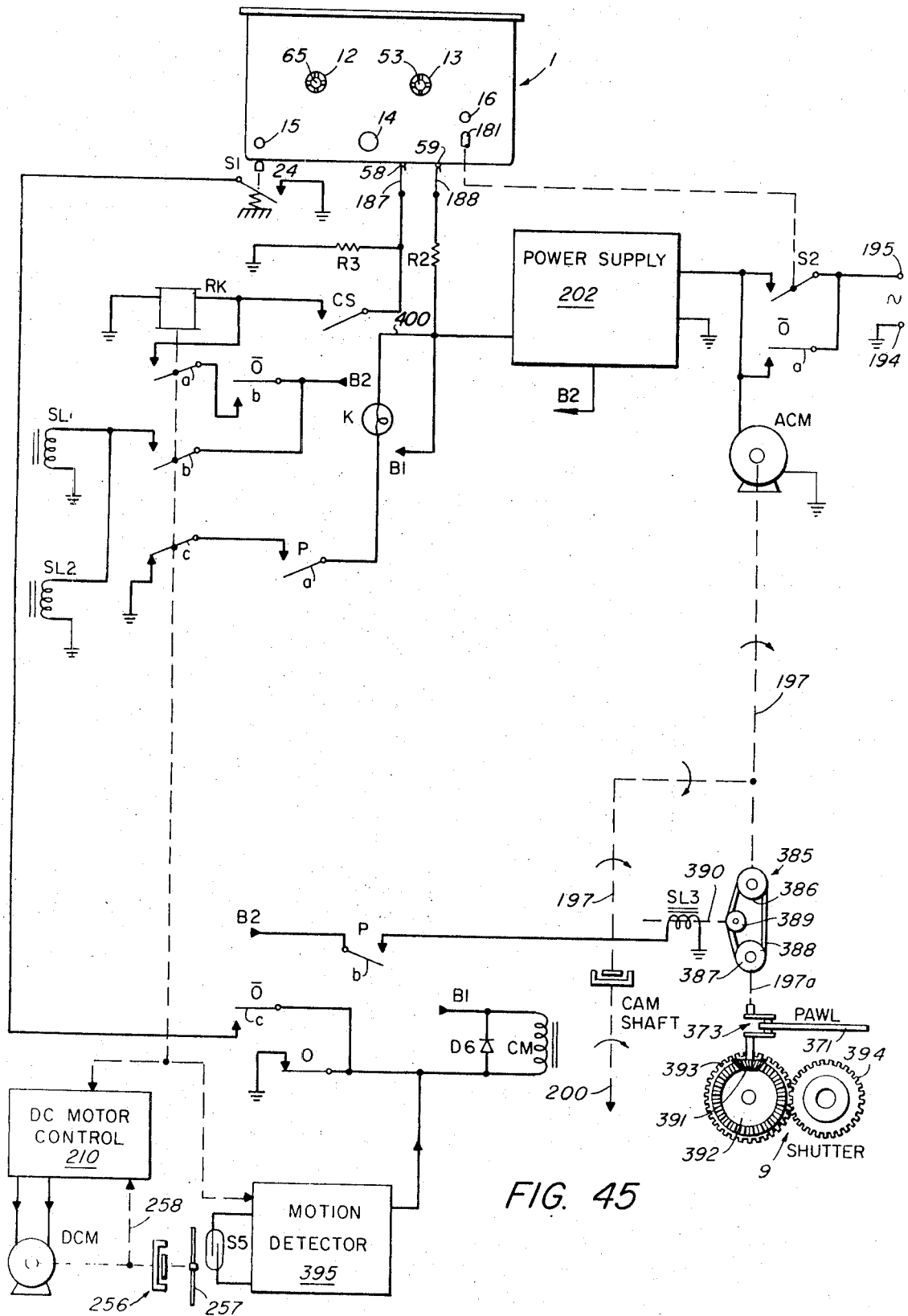
Figure 46:
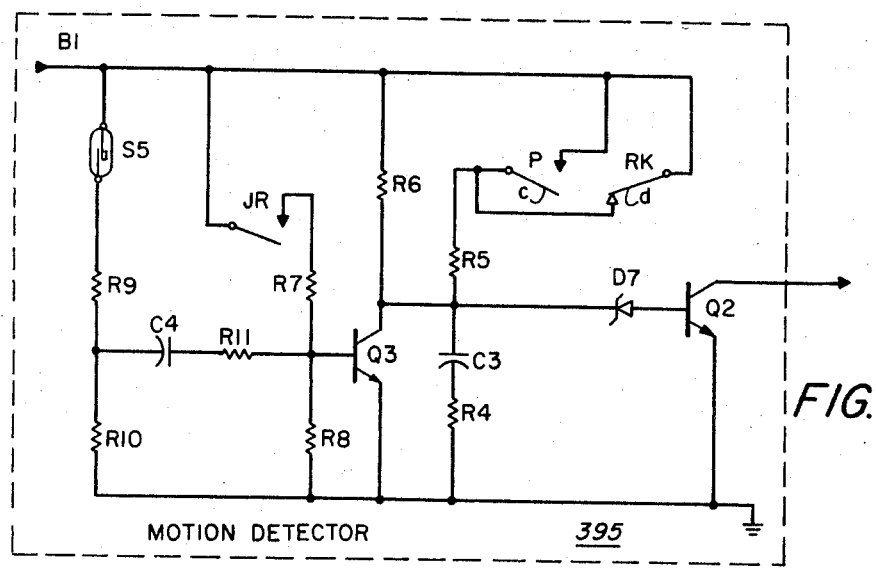
Figure 47:
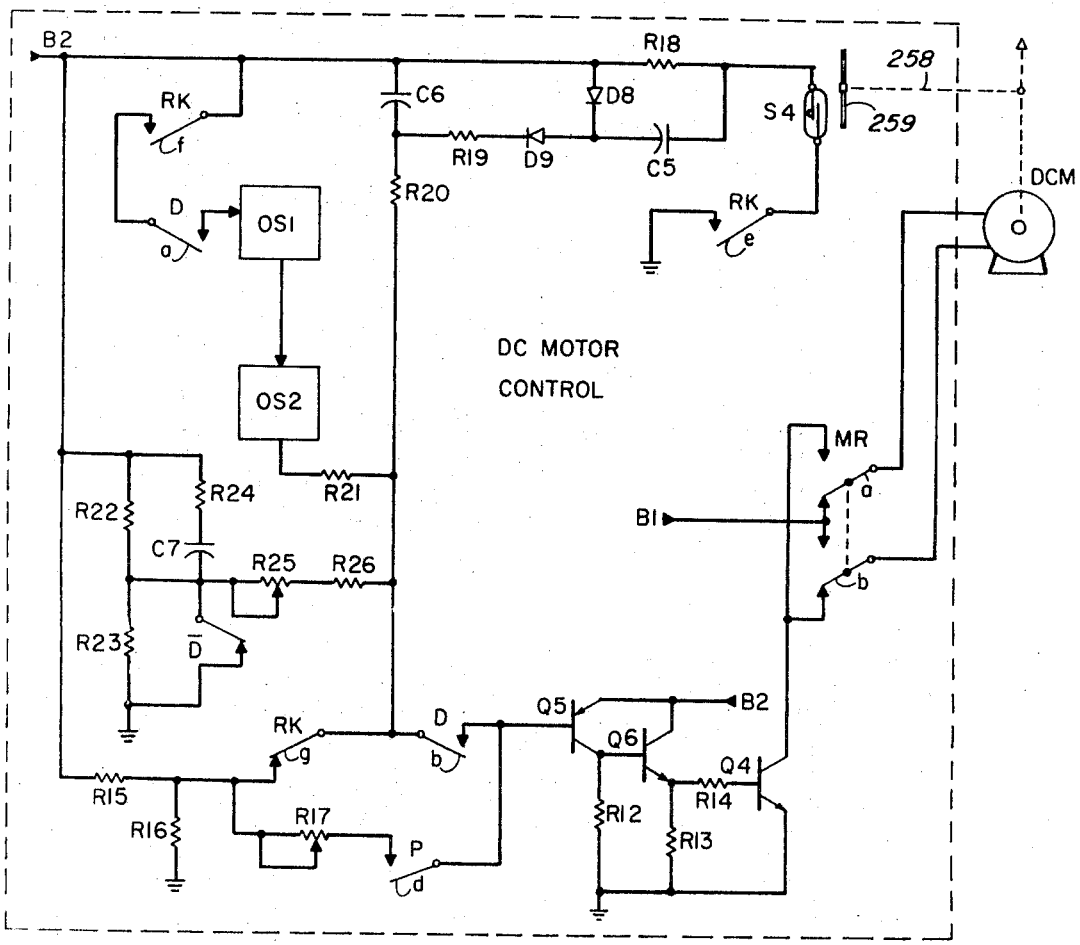

FIGS. 8 and 9 are schematic fragmentary cross sectional elevational views, with parts shown in cross section and parts broken away, of further details of a portion of the release mechanism of FIGS. 5 and 7, taken substantially along the lines 8—8 in FIG. 5, with parts shown from positions taken somewhat behind those lines, showing the parts in two positions and in association with a portion of a detent release mechanism forming a part of the film drive and projection system of FIG. 1;

FIG. 10 is a schematic fragmentary plan view, with parts shown in cross section, parts omitted and parts broken away, showing the apparatus of FIG. 5 in another position assumed during its operation;

FIGS. 11, 12, and 13 are fragmentary schematic plan views, with parts shown in cross section, parts omitted, and parts broken away, showing on an enlarged scale the sequence of operation of processing apparatus forming a part of the apparatus of FIG. 5;

FIG. 14 is a schematic perspective sketch of a pressure pad forming a part of the apparatus of FIG. 5;

FIG. 15 is a schematic perspective sketch of a coating nozzle forming a part of the apparatus of FIG. 5;

FIG. 16 is a schematic cross sectional elevational view of the nozzle of FIG. 15, taken substantially along the lines 16—16 in FIG. 15;

FIG. 17 is a schematic perspective sketch of a pressure pad depressing cam and nozzle closure plate assembly forming a part of the apparatus of FIG. 5;

FIG. 18 is an elevational view of the apparatus of FIG. 17, taken substantially along the lines 18—18 in FIG. 17;

FIG. 19 is a schematic fragmentary plan view, with parts shown in cross section, parts omitted, and parts broken away, illustrating a portion of the film drive and projection system of FIG. 1;

FIG. 20 is a fragmentary schematic perspective sketch of a locating pin latching mechanism forming a part of the apparatus of FIG. 19;

FIG. 21 is a fragmentary schematic plan sketch, with parts omitted, parts shown in cross section, and parts broken away, of a locator pin and its actuating mechanism forming a part of the apparatus of FIG. 19;

FIG. 22 is a schematic perspective sketch of a yoke forming a part of the apparatus of FIGS. 19-24;

FIG. 23 is a schematic perspective sketch of a cam follower forming a part of the apparatus of FIGS. 19-24;

FIG. 24 is a schematic fragmentary end view, with parts shown in cross section, parts omitted, and parts broken away, of the apparatus of FIG. 21, taken substantially along the lines 24—24 in FIG. 28 and showing the parts in the position assumed in FIG. 28;

FIG. 25 is a cross sectional elevation of the apparatus of FIG. 24, taken substantially along the lines 25—25 in FIG. 28;

FIGS. 26-28 comprise schematic fragmentary plan views, with parts shown in cross section, parts omitted, and parts broken away, showing the apparatus of FIG. 21 in various other positions assumed during its operation;

FIGS. 29 and 30 are fragmentary schematic elevational views, with parts omitted, parts shown in cross section, and parts broken away, showing a lamp housing and blinder mechanism therefor, forming a part of the apparatus of FIG. 19 in two positions assumed during its operation;

FIG. 31 is a cross sectional elevational view of the apparatus of FIG. 29, taken substantially along the lines 31—31 in FIG. 29;

FIG. 32 is a view similar to FIG. 31, but with the lamp housing omitted;

FIG. 33 is a fragmentary schematic cross sectional elevational view, with parts omitted and parts broken away, showing a cassette ejecting mechanism and spindle plate stop mechanism forming a part of the apparatus of FIG. 19, taken substantially along the lines 33—33 in FIG. 19;

FIG. 34 is a schematic perspective fragmentary sketch of the spindle plate stop mechanism forming a part of the apparatus of FIG. 33;

FIG. 35 is a view similar to FIG. 33, showing the parts in another position assumed during their operation;

FIG. 36 is a view similar to FIG 33, showing the parts in still another position assumed during their operation;

FIG. 37 is a schematic perspective sketch of a pressure plate lifting mechanism forming a part of the apparatus of FIGS. 1 and 18;

FIG. 38 is a schematic cross sectional elevation of a portion of the apparatus of FIG. 19 taken substantially along the lines 38—38 in FIG. 19 and showing the pressure plate lifting mechanism in its cooperative relationship with a cassette;

FIG. 39 is a view similar to FIG. 38, showing the parts in another position assumed during their operation;

FIGS. 40 and 41 are fragmentary schematic plan views, with parts omitted, parts shown in cross section, and parts broken away, of a blinder mechanism forming a part of the apparatus of FIG. 19, in two positions assumed during its operation;

FIG. 42 is an end view of the apparatus of FIGS. 40 and 41, taken substantially along the lines 42—42 in FIG. 40;

FIG. 43 is a schematic elevational cross sectional sketch of a film drive mechanism forming a part of the apparatus of FIG. 19, shown in conjunction with a portion of a cassette cooperating therewith;

FIG. 44 is a schematic block and wiring diagram of a cam shaft and associated parts forming a part of the apparatus of FIG. 19;

FIG. 45 is a schematic block and wiring diagram of a portion of the electrical control system for the apparatus of FIG. 19, shown in conjunction with a cassette;

FIG. 46 is a schematic wiring diagram of a motion detector forming a part of the apparatus of FIG. 45; and FIG. 47 is a schematic wiring diagram of a DC motor control circuit forming a part of the apparatus of FIG. 45.

FIG. 1 shows the system of the invention in its external cooperative aspects. The basic elements of this system are a cassette 1, adapted to be inserted in a pocket 2 formed in the outer housing 3 of a film drive and projection system generally designated 4. A translucent viewing screen 5, on which projected images at times appear, is mounted at the front of the housing 3.

As best shown in FIG. 2, the pocket 2 has a floor 6 on which an aperture plate 7 is mounted. The aperture plate 7 is adapted to extend into the cassette such as 1 and there register with the film in the cassette. Light supplied in a manner to be described passes through the film, and thence over a path traversing a suitable framing aperture in the aperture plate 7, a cooperating recess in the floor 6, a blinder housing 8, to be described, and a conventional shutter 9, to a lens 10. The lens focuses an image of the portion of the film selected by the framing aperture on a mirror 11, whence it is reflected to the screen 5.

As shown in FIG. 1, the cassette 1 is provided with a number of light-baffled openings, 12, 13, 14, 15 and 16. These openings expose parts adapted to cooperate with corresponding parts of the film drive and projection system to perform various functions in the cassette. Thus, a sprocket formed on the takeup reel is accessible through the opening 12. A similar drive sprocket formed on the supply reel is accessible through the opening 13. Projection light is at times admitted to the cassette through the opening 14. A stop can enter, to brake a snubber roll forming a part of the cassette, through the opening 15. The opening 16 serves to admit a locating pin, forming a part of the film drive and projection system, to register the presence of a cassette in the system and to enable the processing apparatus in a manner to be described.

A flange 17 is formed on the upper end of the cassette 1. This flange aids in grasping the cassette while inserting it in, or removing it from, the pocket 2. It also helps to fix the cassette in position in the film drive and projection system, by engagement with the rim of the pocket 2.

Referring to FIG. 3, parts adapted to enter the openings in the cassette 1 are adapted to enter the pocket 2 through corresponding openings in a side wall 18 of the pocket. Drive sprockets for the supply and takeup reels are adapted to enter through openings 19 and 20, respectively. A light beam for projection enters through an opening 21. The locating pin enters through an opening 22. The snubber roll stop enters through an opening 23.

In addition to the aperture plate 7 described above, the actuating arm 24 of a normally closed switch S1 is movably mounted on the floor plate 6. This switch is adapted to be opened when a cassette is inserted in the pocket 2, for purposes to appear.

A foot pedal 25 is movably mounted in the pocket 2 to be depressed by the insertion of a cassette. The foot pedal is connected to an actuating arm extending through the floor plate 6, as will be described below.

The photographic system of the invention preferably makes use of a photofinishing process in which a strip of film, following exposure in the camera, is contacted with a single processing composition to form a finished transparency from the latent image or images formed on the film during its exposure. The physical construction of such film, the nature of the photosensitive coating thereon, and suitable processing compositions therefor, will next be discussed in connection with FIG. 4.

Referring to FIG. 4, there is shown a film strip generally designated 26, which comprises a leader 27 terminating at an end formed with an aperture such as 28. The aperture 28 serves to connect that end of the film to a takeup reel, to be described.

Behind the leader, which may be in the neighborhood of 18 inches in length, there is a strip 29 of photographically useful film, upon which projectable images may be formed. The strip 29, may be, for example, approximately 52 feet in length for 8mm film.

Following the photographically useful portion of the film is a trailer region generally designated 30. The trailer 30 terminates at another end formed with an aperture 35 by means of which that end of the film is adapted to be connected to a supply reel, to be described.

The film 26 may comprise a base of any suitable transparent material of the kind conventionally used for film bases. On this base is applied, at least over the central portion of the photographically usable length of the film 29, an emulsion comprising a photosensitive coating, whereon a series of latent images illustrated by a series extending from a first frame 36 to a last frame 37 may be formed with a camera. The photosensitive coating is preferably of one of the forms, next to be described, which can subsequently be processed to form a projectable image on the film base.

Photosensitive coatings usable in the practice of the invention may be of any conventional variety adapted to be developed by a monobath processing composition to form a positive transparency suitable for projection. In particular, a currently preferred embodiment of the invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer reversal processes for the projection of black and white images, a silver halide developer and a silver halide solvent are applied in an aqueous alkaline solution to a photoexposed silver halide emulsion stratum, where they develop exposed silver halide to silver, and react with unreduced silver halide to form a soluble silver complex. This complex, in order to form a positive print, is transferred and reduced to silver on a silver-receptive stratum upon which the silver halide stratum has been superposed.

In one practice, in the completion of this process, the silver-receptive and silver halide strata have been separated in order to render the positive print visible. However, as indicated above, the positive print may be rendered visible without separation of the silver halide and the silver-receptive strata. For example, the silver-receptive stratum may be so constructed as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in superposition provide a composite print that presents a good image for projection purposes so long as they are obtained on a transparent support. Since the silver halide stratum and the silver-receptive stratum need not be separated, an overall simplification of the silver transfer reversal process is achieved.

A composite film assembly of this type, as wall as processing compositions for producing a fully developed black and white image without the necessity of removing the developed negative image after processing, are shown in prior U. S. Pat. No. 2,861,885 to Edwin H. Land, which issued on Nov. 25, 1958, for Photographic Processes And Products. Other composite film assemblies capable of producing developed full color images without the necessity of removing the developed emulsion are shown in prior U. S. Pats. of Edwin H. Land, Nos. 2,726,154, issued Dec. 6, 1955 for Photographic Product, and U.S. Pat. No. 2,944,894, issued July 12, 1960 for Photographic Processes Utilizing Screen Members.

It should be noted that the invention is not directed to the chemistry by which images are developed in a photosensitive emulsion and transferred to an image receiving stratum. However, in the practice of the invention, whether the film employed is black and white or color film, at the present time the preferred embodiment of the invention employs film of a type not requiring the removal of a negative emulsion after it is developed.

Referring again to FIG. 4, the film 26 is formed along one edge with sprocket holes such as 38 at regular intervals adapted to cooperate with a drive pawl, in a manner to be described, in either camera or projector, for incremental advancement of the film. The series of sprocket holes 38 adjacent the trailing end of the film may be interrupted by a first elongated sprocket hole 39. This elongated hole 39 may span, for example, two of the sprocket holes 38.

Further along the film in the direction of the supply reel end, the series of sprocket holes 38 is again interrupted by a second elongated sprocket hole 40, longer than the sprocket hole 39 and, for example, spanning three of the sprocket holes 38. As will appear, the first elongated sprocket hole 39 establishes an exposure end point in the camera, whereas the second sprocket hole 40 determines a film takeup termination point in the film drive and projection apparatus to be described.

Basically, termination of film advance at the first elongated sprocket hole 39 is attained by the use of a single drive pawl in the camera, which sequentially engages the sprocket holes 38 to advance the film by one frame length in a conventional manner. Toward the end of each such advance stroke, as is conventional, the pawl is cammed down out of engagement with the film. When the single pawl engages the elongated aperture 39, the camming down movement occurs before the film engages the leading edge of the elongated hole, and therefore the pawl may cycle repeatedly without further advance of the film. This serves to effect a termination of film advance for the purposes of exposure adjacent the end of the region of photographically useful emulsion, to alert the photographer, by the somewhat different sound produced when the pawl skips the film, that his cassette should be replaced.

The film drive and projection system is provided with a double pawl, comprising two integral pawls spaced apart by one frame length, each pawl being of the same shape as the single pawl in the camera. When the first elongated aperture 39 is encountered, the leading pawl of the pair serves to engage the leading edge of the aperture 39 to cause the film to be advanced without interruption. For normally spaced sprocket holes 38, both of the pawls engage the film in sequential sprocket holes. However, when the second elongated sprocket hole 40 is encountered, the pawls will pass through it without film engagement, and thereby terminate film advance in the same manner as did the single pawl upon engagement of the double length sprocket hole 39.

Formed on the trailing end 30 of the film 26, beyond the exposure advance termination portion just described in the direction of the supply reel end of the film 26, is a singularity generally designated 41 comprising a detent engaging element here shown as an aperture 42 formed in the film, adjacent which a projecting bump 43 is formed, as by pressure, heat and pressure, or the like. The singularity 41 thus comprises a hook adapted to engage a detent in the form of a process control actuating element, to be described, as the film is moved with respect to the detent in the direction of the takeup reel.

The bump 43 forming a part of the detent engaging assembly 41 in FIG. 4 projects from the film, and might be deformed, or might cause pressure marks on other parts of the film, as it is wound on the reel. To avoid that result, it is preferred to provide suitable pockets, not shown, comprising apertures formed in the trailing end 30 of the film, and spaced at suitable intervals with respect to the radius of the supply reel spool, to be described, to receive the projection 43 as the film is wound onto the reel. This provision allows the film to be evenly wound on the spool, without deformation of the bump.

Formed on the leader end 27 of the film 26 is another detent engaging means, here shown as an aperture 44 in the central region of the film. This aperture serves to actuate a valve member forming a part of the processing apparatus to be described, for purposes to appear.

FIG. 5 shows, in part fragmentarily and in part schematically, the pertinent elements of an internally programmed cassette 1 adapted for use in the system of the invention. The cassette comprises a housing formed of any suitable opaque material such as metal, plastic, or the like, and preferably manufactured in two cooperating parts.

As shown in FIGS. 5 and 6, the housing parts comprise a base generally designated 45, comprising side walls 46 and a base plate 47. The base plate 47 extends across the base of the walls 46, and comprises one side of the housing. The walls 46 extend at least in part about the periphery of the base plate 47, and cooperate with interfitted walls 48 of a cover generally designated 49. The walls 48 overlap the corresponding segments of the walls 46 to form the sides of the housing of the cassette 1.

A cover plate 50 is formed integral with the walls 48, and completes the upper side of the housing as seen in FIG. 6. The terms "base," "cover," "upper," and "lower" are relative, and are adapted simply for convenience. Similarly, the selection of the parting lines between the walls 46 and 48 are a matter of convenience. In particular, the choice is preferably so made that the base 45 can serve as a support upon which all of the additional fixed and moving parts to be described may be assembled before the cover 49 is put in place.

When the cover is placed in position, it may be formed integral with the base 45 by heat sealing, or by a suitable adhesive, or the like. If of metal, the interfitting parts may be interlocked with cooperating detents formed therein, in a manner conventional and well known to those skilled in the art.

The base and cover parts form, when assembled, the end flange 17 that serves to support and locate the cassette 1 in either a camera, or in the film drive and projection system of FIG. 1.

Rotatably disposed within the cassette housing is a supply reel generally designated 51. The reel 51 is provided with an upper flange 52 and a corresponding lower flange, not shown in FIG. 5 to guide the film strip 26 as it is wound about the spool portion of the reel 51, not shown, to which the supply end 30 of the film 26 (FIG. 4) is attached.

A sprocket schematically indicated at 53 may be formed integral with the reel 51 to adapt the reel to be driven about its axis of rotation. Access to the sprocket 53 may be provided through the aperture 13 in the cover plate 50 (FIG. 1), light-baffled by suitable conventional annular flanges, not shown, formed in cooperating relation on the cover plate 50 and on the upper surface of the flange 52 (FIG. 5). The lower flange of the reel 51 may be formed in a conventional manner with a cylindrical axial opening to receive a cooperating axle, not shown, formed integral with the base plate 47.

A hub 54, formed integrally with the base plate 47, serves as a bearing for an arm 55 that is rotatable in the housing about the axis of the reel 51. The arm 55 forms part of a composition release mechanism, to be described.

Initially, the film 26 is in its unexposed state and coiled primarily about the supply reel 51. It is shown in FIG. 5 in the position assumed as it nears the end of its movement away from the supply reel, as toward the end of exposure in a camera, in which it is nearly exhausted from the reel 51.

In its path from the supply reel 51, the film 26 first encounters a bobulator roll 56. The film engages a portion of the periphery of the bobulator roll, as shown, and passes therefrom around a conventional idler roll 57 journalled for rotation in the housing, and thence through film processing means, to be described below. In addition to the apparatus for processing the film in a manner to be described, the film processing means comprises a signal generator for producing an external condition signal on terminals schematically indicated at 58 and 59, to indicate whether or not the processing means has been actuated.

Beyond its path through the film processing means, the film 26 extends through a conventional light-baffled aperture schematically indicated at 60 and forming a portion of a film gate in the housing. The film 26 reenters the housing through a second light-baffled aperture generally designated 61 and comprising a second portion of the film gate.

The film 26 next passes over a conventional snubber roll, generally designated 62, and finally passes to a takeup reel generally designated 63, comprising a spool portion to which the takeup reel end of the film is connected, and about which the film is wound as suggested in FIG. 5.

In addition to parts corresponding to those parts described in connection with the supply reel 51, the takeup reel comprises an external upper flange 64 protruding beyond the maximum radius of the film 26 when substantially stored on the takeup reel. On the flange 64 is formed a suitable drive sprocket 65, by means of which the film can be selectively advanced in a manner to be described.

The bobulator may be of any conventional construction suitable for the performance of the known function of isolating the film drive pawl associated with the camera, or the pawl associated with the projector, from the inertia of the supply reel 51. However, it is preferably of the form shown, in which the bobulator roll 56 is journalled on a pin 66 for rotation by the film.

The pin 66 is formed integral with a support 67 of plastic or the like. The support 67 is journalled to the base plate 47 by means of a pin 68 formed integral with the base plate, and biased by a spring 69 formed integral with the support 67. The spring 69 acts against a post 70 formed integral with the base plate 47. The bobulator roll 56 can thus both rotate about the pin 66, and move backwards and forwards in the directions of the double arrow shown in FIG. 6.

The bobulator roll responds to increases or decreases in the tension of the film 26 by temporarily shortening or lengthening the film path, respectively. Such changes in film tension are produced by the actuation of the film drive pawl, and are determined by the inertial forces exerted by the supply reel 51, together with the larger or smaller supply of film that may be on it at any given time. By that arrangement, as the film is advanced incrementally by the pawl associated with the camera or projector, it can rapidly move the bobulator roll against the spring 69 without immediately affecting the supply reel, which can then more or less gradually allow the bobulator roll to relax while supplying the segment of film taken by the pawl.

A lighttight shield around the film gate formed by the apertures 60 and 61 is formed by a wall portion 75 formed integral with the base plate 47 and made integral with the cover plate 50 after assembly of the parts in the manner described above. An exposed chamber behind the film 26 is thus formed for the purpose of admitting projection light.

The apparatus for this purpose is conventional, and will only briefly be described. In short, it comprises a prism generally designated 76 and comprising a mirror, not shown, but disposed at 45° to the plane of FIG. 5. As schematically indicated, the prism 76 is mounted between extensions 77 formed on the wall 75.

Light enters the cassette through the port 14 formed in the cover plate 50 in directions normal to the plane of FIG. 5. The mirror in the prism 76 directs this light downwardly through the film 26 in the film gate for the projection of images on the film through the lens 10 (FIG. 2).

Also disposed in the chamber bounded by the wall member 75 and the film passing through the film gate is a conventional pressure plate 78, located between the prism and the film, and biased by a spring 79 into engagement with the film. The spring 79 is supported and retained by suitably shaped extensions 80 of the support wall 75, as shown.

The pressure plate serves in the conventional manner to cooperate with a camera, by locating the focal plane of the film during exposure. An aperture 81 is provided in the pressure plate 59, as schematically indicated, to pass light entering through the prism assembly 76 through a selected frame of the film 26, after the film is processed in a manner to be described. It is preferred that the aperture 81 be somewhat larger than the frame to be projected so that the aperture in the aperture plate 7 (FIGS. 2 and 3) serves as the limiting aperture bounding the projected frame.

The snubber roll 62 may also be of entirely conventional construction. As illustrated, it is provided with a hub portion schematically indicated at 82 that is adapted to protrude through the (suitably light-baffled) aperture 15 in the cover panel 50 for engagement by a stop member, comprising a part of either the camera or of the film drive and projection system, that is engaged when the film is to be incrementally advanced by a pawl for exposure or projection purposes. The cooperation between the snubber roll 62 and the takeup reel 63 is conventional, but will be briefly described.

The drive sprockets 53 and 65 of the supply and takeup reels 51 and 63, respectively, are adapted to be engaged by corresponding drive sprockets comprising a part of a camera, or of the film drive and projection apparatus to be described. In the film drive and projection apparatus, both supply and takeup reels are adapted to be driven through slip clutches. In the camera, only a drive for the take-up reel need be provided. This drive comprises a slip clutch connected to a sprocket driving the takeup reel drive sprocket 65, in cooperation with a drive pawl for sequentially engaging a series of the sprocket holes 38 formed in the film 26, along a portion of the edge of the film in the film gate between the apertures 60 and 61.

When the snubber roll 62 is stopped by engagement of the hub 82 as described above, operation of either the camera or of the film drive and projection system to incrementally advance the film towards the takeup reel, by engagement of a pawl with the sprocket holes in the film 26, will momentarily loosen the film from engagement with the stationary snubber roll 62 and allow the slip clutch driving the takeup reel 63 to takeup up that increment of the film advanced by the pawl. Between engagements of the pawl, the slip clutch prevents the takeup reel from advancing the film.

In the film drive and projection system to be described, the snubber roll 62 is engaged only while the film is to be incrementally advanced onto the takeup reel. When the film is rewound onto the supply reel, the snubber roll 62 is disengaged and acts an an idler. As will appear, that may occur either during the processing of the film while rewinding, or during subsequent rewinding of the processed film after projection.

The film processing means will next be described, in its presently preferred embodiment, with reference first to FIG. 5. As there shown, the apparatus generally comprises wall means comprising portions of, or formed integral with, the base plate 47 and the cover plate 50, which serve to guide, support and house the various elements of the processing apparatus to be described. These walls form an outer film composition containing housing generally designated 83, defining a chamber in which there is mounted an initially sealed container generally designated 84 of processing composition. The container 83 communicates with a coating nozzle generally designated 85. These elements are mounted above the plane of the film 26.

Principally located below, but in part surrounding, the film 26 is a pressure pad generally designated 86. The pressure pad is acted on by a spring, generally designated 87 and to be described in detail below.

The basic elements of the processing station further comprise a combined pressure pad deflection cam and nozzle closure valve assembly generally designated 88, and a pair of electrical terminals 58 and 59. The terminals 58 and 59 cooperate with the cam and valve assembly 88 in a manner to be described below to provide a signal indicating whether or not the film 26 has been processed.

More specifically, the outer container 83 comprises walls 89 formed integral with the floor plate 47 and extending upwardly therefrom in FIG. 5. The walls 89 and floor plate 47 form a container open on a side that is closed by a cover panel fragmentarily shown at 90 of the same general configuration as the region bounded by the walls 89 of the container 63.

The panel 90 is preferably put in place prior to assembly of the cover 49 with the base 45, and serves as a support for the top plate 50 after final assembly. As schematically indicated, the walls 89 are formed with an upper lug 91, and a lower ledge portion 92, in each of which are formed locating recesses 93 and 94, respectively, adapted to receive corresponding locating posts, not shown, formed on the inside of the cover panel 90 to aid in locating the panel 90 during its installation as the cover of the container 83.

The initially sealed container 84, mounted within the outer container 63, comprises a tub-like receptacle 95, of a suitable plastic or the like, selected to resist interaction with the processing composition, or permeation thereof by ambient gases. The receptacle 95 initially contains a charge 96 of processing composition in an adequate amount to process the film 26.

The receptacle 95 is formed on an open side with a circumscribing flange 97 adapted to fit into corresponding slots formed in the base plate 47 and the cover panel 50. As shown in FIG. 5, the flange 97 rests against a shoulder formed on the lug 91 at the upper end of the wall 89, and projects over the ledge 92 formed at the lower end of the wall 89.

The container 84 is sealed to initially contain the processing composition 96 by one end 98 of a tear-tab generally designated 99. The tear-tab 99 may be made of any suitable form of plastic material selected to resist the action of the composition 96, and to avoid interaction therewith, as well as to prevent the diffusion into the composition of gases such as oxygen, carbon dioxide, carbon monoxide, water, oxides or hydrides of sulfur or nitrogen, or the like, that might modify its composition. The end 98 is sealed to the plane surface of the flange 97 surrounding the opening formed in the receptacle 95, and within the flange area extending into the mounting recesses described above, by any suitable means such as heat sealing, by a suitable adhesive, or the like.

The tear-tab 99 extends from the end 98 sealed to the receptacle 95 back upon itself and out through an aperture 100 formed in the walls 72 to the processing composition release mechanism, to be described below.

Outside of the sealed container 84, the walls 89 define a chamber 101 into which the processing composition 96 can flow when the tear-tab 99 is partially detached from the receptacle 95 in a manner to be described. The outer chamber 101 communicates with the coating nozzle 85 by way of a downwardly converging section 102 that communicates with a downwardly converging inlet passage formed in the nozzle 85.

Referring now to FIGS. 5, 15 and 16, the coating nozzle 85 may be formed in a conventional manner, as by precision molding or the like, from a suitable thermoplastic resin selected to form a dimensionally stable and accurate molding whose working surfaces can be kept to close tolerances. The most critical of these form a plane, generally U-shaped film engaging land 103 formed on the base of the nozzle, as best shown in FIG. 15, and a doctor bar 104, lying across the bend of the U-shaped land 103, and recessed beneath it as best shown in FIG. 16.

The depth to which the doctor bar is recessed is recessed is greatly exaggerated in FIGS. 15 and 16; it is selected to be twice the desired thickness to which the coating composition is applied to the film 26. The land 103 and the doctor bar 104 circumscribe a generally rectangular outlet aperture 105 formed in the nozzle and communicating with the downwardly converging passageway 106 through which the processing composition is received from the outer container 83, described above.

The nozzle 85 is formed to be received in cooperating slots formed in the housing parts, to hold it in the position shown in FIG. 5. Referring to FIGS. 5 and 15, the ends 107 and 108 of the nozzle engage corresponding notches 109 and 110 formed in an extension 111 of the wall 75, and in the ledge 92, respectively, to receive the nozzle 85. The sides 112 and 113 of the nozzle 85 are retained by the base plate 47 and cover plate 50 of the housing.

The nozzle 85 is provided at the sides with posts 114 and 115 that provide guidance for the film in its path over the coating gap. These posts also serve at times to stop the nozzle closure plate portion of the element 88, to be described. Referring now to FIG. 15, when engaged with the film in the manner to be described below, the film is adapted to pass over the nozzle outlet port and between the posts 114 and 115 with the emulsion side of the film in engagement with the land 103. During this engagement, coating takes place while the film moves, so that the emulsion surface leaves the apertures 105 as it passes over the doctor bar 104 and carries with it a coating of processing composition established by the depth to which the bar 104 is recessed below the land 103.

Referring again to FIG. 5, and also to FIG. 4, the pressure pad 86 will next be described. The pressure pad 86 is shown in FIG. 5 in the initial position assumed upon assembly of the cassette and prior to processing of the film 26.

As shown in FIG. 5, the film 26 normally passes below the nozzle 85, and above a normally disengaged film engaging pad surface 116. The pad surface is formed on an upwardly extending and generally rectangular protrusion in a base plate 117, as best shown in FIG. 14. The pressure pad 86 may be made of any suitable conventional material, such as stainless steel or the like. The raised surface 116, formed by die stamping or the like, is ground or otherwise finished with a film engaging plane surface 118, of generally U-shaped configuration as illustrated in FIG. 14, that is adapted to mate, through the film 26, with the plane of the land 103 of the nozzle (FIGS. 15 and 16) and generally conform to the working area of the nozzle 85 confined between the land 103 and the doctor bar 104 and encompassing the rectangular opening 105 through which the processing composition passes.

As shown in FIGS. 5 and 14, the pressure pad 86 is formed with an end 119 that is adapted to lightly engage the base side of the film 26 in the initial position shown in FIG. 5, for purposes to appear. Formed adjacent the end 119 on the plate 117, and extending outwardly therefrom, are a pair of ears 120 adapted to extend up past the film 26 on either side and to ultimately engage the underside of the nozzle 85.

The pressure pad 86 is formed at its other end with a pair of upstanding ears 121 formed integral with the plate 117 and extending upwardly past the film in FIG. 5 to engage a sloping ledge 122 formed in the lower side of an extension 123 of the walls 75 and 89. The extension 123 is formed integral with the base plate 47 and joins the wall 75 defining the projection aperture.

Referring again to FIG. 5, the ears 121 initially hold the film engaging surface 116 of the pressure pad out of engagement with the film. As will appear, the ears 121 of the pressure pad also serve at times as guides for the combined pressure pad depressing cam and nozzle closure plate assembly 88, to be described.

The base plate 117 of the pressure pad is divided to form a pair of legs 124 which are bent downwardly somewhat in the region of the ears 121 as suggested in FIG. 14. Between the legs 124 is formed a downwardly depending hook element 125 that initially serves as a detent to hold the pressure pad 86 in an inactive position in the housing. For that purpose, as best shown in FIG. 5, the hook 125 is engaged in the initial position shown by an upwardly bent end 126 formed at the end of the spring 87.

As shown in FIG. 5, the spring 87 comprises a base portion 127 that is cut out to clear a bearing post 128 on which the idler roll 57 is journalled. The base portion 127 is further provided with a pair of mounting apertures in which suitable fasteners, shown as a pair of screws 129 in FIG. 5, can pass for securing the base 127 to the base plate 47. In practice, the base 127 of the spring 87 may be secured by heat staking it to the thermoplastic material of the base plate 47, as by heating and melting a portion of the base plate 47 through the apertures in the base 127. Alternatively, the spring may be secured by rivets, or other fasteners or the like could be employed.

From the base portion 127 a resilient spring arm 130 extends, in planes normal to the base, into engagement with the film engaging portion of the pressure pad 86, and thence to its termination 126 initially engaged with the hook 125. Intermediate the ends of the arm 130 is formed a pressure pad engaging button 131, fragmentarily shown in FIG. 12, that serves to engage the lower surface of the raised portion 116 of the pressure pad 86 and urge it toward engagement with the film 26.

Referring now to FIG. 5 in conjunction with FIGS. 17 and 18, the pressure pad depressing cam and nozzle closure plate assembly 88 will next be described. Referring first to FIGS. 17 and 18, the assembly 88 comprises a plane base plate 132 formed at one end 133 with tapering sides 134 to guide entry of the end 133 into a position covering the outlet port 105 in the nozzle 85, in a manner to appear, to close the nozzle at the end of the processing operation. In that position, a pair of shoulders 135 on the plate 132 cooperate with the posts 114 and 115 on the nozzle 85 to stop the nozzle in its final position.

Formed as orthogonal extensions on the sides of the base plate 132 are a pair of cams 136 and 137 that serve at times to depress the pressure pad, described above, in a manner to appear below. The cam 137 is shorter than the cam 136, to facilitate threading of the film 26 during assembly of the cassette.

Toward the left end of the plate 132, as best shown in FIGS. 17 and 18, the cam 136 is formed with a normally extending arm 140 that extends generally parallel to the plate 132 and is formed with a pair of spring arm extensions 141 and 142. These arm extensions taper away from each other towards the ends, to allow entry of a film aperture in a manner to appear.

A central portion 143 is bent upwardly and away from leg extension portions 145 of the base plate 132, as best shown in FIG. 17, to form a hook having as its upper portion the extension 143 and as its lower portions the arms 145. Referring again to FIG. 5, these hook elements initially engage a ledge portion 146 formed integral with the base plate 47 to hold the assembly 88 in the position shown. In that position, the cams 136 and 137 extend into and are guided by the ears 121, and the nozzle closing plate end 133 of the assembly 88 confronts but does not engage a downwardly sloping guide ledge 147 formed on the wall extension 111 referred to above.

The upper spring arm 141, of the hook comprising that arm and the lower arm 142 formed on the assembly 88, lightly engages the base of the film 26 in the initial position of the parts shown in FIG. 5. The upwardly bent end of the arm 141 thus serves as a unidirectional detent that is adapted to engage an aperture in the film, in a manner to be described below, towards the end of the processing cycle to be described.

The cam portion 136 of the assembly 88, of metallic conducting material, cooperates with contacts 148 and 149 formed integral with the terminals 58 and 59, respectively, (FIG. 5), to form a signal generator indicating whether or not the film 26 has been processed. For this purpose, in the initial position of the parts shown in FIG. 5 assumed before the processing cycle is started, the cam 136 engages both contacts 148 and 149 and thus bridges them to supply an external signal, in the form of a closed circuit path, to the terminals 58 and 59, indicating to the film drive and projection apparatus, to be described, that the film is not processed.

As will appear, at the end of the processing cycle, the assembly 88 will be carried to the right in FIG. 5, opening the contacts 148 and 149 to cause an open circuit to be presented to the terminals 58 and 59, indicating that the film has been processed.

The construction of the processing composition release mechanism will next be described with reference to FIGS. 5, 7, 8, 9 and 10. As shown in FIG. 5, the tear-tab 99 extends out through the aperture 100 in the outer container 83 and thence over an idler 150 journalled for rotation in the housing by means schematically shown as a bearing post 151 formed integral with the base plate 47. The tear-tab 99 passes from the idler 150 about another idler, here shown simply as a post 152 formed integral with the floor plate 47.

A loop 153 is formed on the end of the tear-tab 99, as by folding the tear-tab back upon itself and there securing it by heat sealing, or by a suitable adhesive or the like. The loop 153 engages a pin 154 forming a part of the tear-tab release mechanism.

As best shown in FIG. 7, the pin 154 is adapted to be guided in tracks formed as grooves 155 in the cover plate 50, and 156 in the floor plate 47. These tracks form parallel, generally spiral path segments that guide the post 154 along a path generally radially outward from the center of the supply spool 52, from the initial position shown in FIG. 5 to the position shown in FIG. 10.

The pin 154 is joined to a post 157 connected to or formed integral with the arm 55 described above. For this purpose, a pair of struts 158 and 159, of steel wire or the like, are connected at their ends to the pin 154 and post 157 as shown in FIG. 7, to form a generally rectangular sled having one end that travels along a radius determined by the arm 55, and a second end formed by the pin 154 that travels in the tracks 155 and 156.

A resilient catch generally designated 160 is connected at one end of the sled just described. The catch 160 may be formed of resilient material such as spring steel or the like, and has one end 161 bent around and engaging the post 157.

The catch 160 extends from the end 161 over an arm 162 formed with outwardly diverging ears 163 and 164. The ear 163 is bent over and thereby secured to the strut 158, and the ear 164 is bent over and thereby secured to the strut 159. The arm 162 is bent at its other end to form an actuator engaging ledge 165.

The ledge 165 extends to an integral hook portion 166. The hook 166 is initially engaged by a detent pin 167 forming a part of a tear-tab release enabling mechanism, to be described.

As will appear, upon removal of the pin 167, the arm 162 is free to move under the influence of its initial bias to carry the hook 166 into engagement with the pin 154, whereupon the ledge 165 will be moved into position to engage one of a series of teeth 168 formed about the periphery of the flange 52 of the supply reel 51. As best shown in FIG. 7, the supply reel 51 is provided with a lower flange 169 upon which corresponding teeth 170, in vertical registry with the teeth 168, are formed.

As shown in FIG. 5, the teeth such as 168 each comprise a slowly radially rising portion 171, and a rapidly radially falling portion that is adapted to engage the ledge 165 when the ledge is released by release of the pin 167, as described above, and when the reel is rotated clockwise in FIG. 5. In the position of the parts shown in FIG. 5, the ledge 165 is held out of engagement with the teeth 168. Upon release of the hook 166, the ledge 165 will engage the rims of the spool 51, whereupon in response to counterclockwise rotation of the spool as shown in FIG. 5, the ledge will simply be deflected by the slowing rising portions such as 171 of the teeth 168. However, upon clockwise rotation one of the teeth 168 will be caught upon the ledge and carry the sled along the tracks 155 and 156, moving the tear-tab 99 and at least partially detaching it from the receptacle 95 to release the composition 96. When the sled is thus moved, to the position shown in FIG. 10, the post 154 will be engaged by a resilient detent 172 secured to an extension 123 of the wall 75, latching the mechanism in the position shown in FIG. 10 with the ledge 165 then permanently out of engagement with the teeth 168.

The release enabling mechanism comprising the pin 166 will next be described with reference to FIGS. 7, 8 and 9. As best shown in FIG. 8, the mechanism comprises a post 175 accessible at one end through the opening 16 in the cover plate 50. A lighttight seal is formed about this aperture 16 by means of a cylindrical flange 176 formed integral with the cover plate 50, and extending between the post 175 and a concentric cylindrical flange 177 formed integral with the post 175.

At its lower end, the post 175 is formed with a coaxial central cylindrical recess 178, which receives a compression spring 179. The spring 179 engages the base plate 47, and is surrounded by a cylindrical annular flange 180 in which the post 175 is guidingly received. The post 175 is thus urged into the position shown in FIG. 8 by the spring 179. It is adapted to be moved into the position shown in FIG. 9 by a locating pin 181, forming a part of the film drive and projection system to be described, that enters the port 16 to depress the post 175 under conditions to be described below.

The detent pin 167 is formed integral with an extension 182 of the post 175 as shown in FIGS. 8 and 9. The extension 182 is adapted to rest against the loop 153 formed on the end of the tear-tab 99, and therethrough to engage and be supported by the pin 154 in the initial position of the parts shown in FIGS. 5 and 7.

When the locating pin 181 enters the opening 16 to move the post 175 to the position shown in FIG. 9, the hook 166 is freed to move into engagement with the pin 154, through the loop 153. The sled including the pin 154 is thereafter free to move out of engagement with the extension 182 formed on the post 175.

Having described one embodiment of the cassette of the invention, its operation will next be described in connection with FIGS. 4–13.

Referring to FIG. 5, it will be assumed that an initially unexposed strip of film 26 stored primarily on a supply reel 51 has been exposed in a camera, so that it has been advanced onto the takeup reel 63 to the exposure termination point determined by the first elongated sprocket hole 39 in the film (FIG. 4). The tear-tab 99 and its release mechanism will be in the positions shown in FIG. 5, with the post 175 in the position shown in FIG. 8, in which the pin 167 engages the hook 166 to hold the catch ledge 165 out of engagement with the rims of the supply reel.

Next, assume that operation continues by the insertion of the locating pin 181 into the port 16 of the cassette. As shown in FIGS. 8 and 9, entry of the pin 181 will depress the post 175, releasing the pin 167 and allowing the hook 166 to travel into engagement with the loop 153 on the tear-tab 99, and, therethrough, with the pin 154. Referring again to FIG. 5, the ledge 165 will now be moved into position to engage the teeth such as 168 formed on the supply reel 51.

Next, assume that operation is continued by further rotation of the takeup reel 63 counterclockwise, as seen in FIG. 5, to bring the film 26 farther onto the takeup reel. During this rotation, the supply reel 51 will move counterclockwise in FIG. 5, causing the teeth 168 to pass the ledge 165 without effective engagement therewith.

FIG. 5 shows the parts of the coating station in their initial position, which is maintained during exposure of the film and during a portion of the first increment of motion just described, from the exposure termination point toward the second termination point in which the film is substantially exhausted from the supply reel, and in which the second elongated sprocket hole 40 in FIG. 4 will be encountered. During the interval of travel between those positions, and prior thereto, the cam and nozzle closure plate assembly 88 is held in place by engagement of the arms 143 and 145 with the ledge 146, and the upper resilient arm 141 of the film engaging hook formed on the assembly 88 is lightly engaging the base of the film 26.

The pressure pad 86 is initially held in place by engagement of its hook 125 with the detent 126 formed on the spring 87. In that position, the end 119 of the pressure pad 86 lightly engages the base of the film 26, and the ears 121 are in engagement with the ledge 122 formed on the wall segment 123.

The parts of the coating station will remain in the position shown in FIG. 5 until, during the further advance of the film 26 towards the takeup reel, the film engaging hook 43 approaches and engages the end 119 formed on the pressure pad 86 as shown in FIG. 11. When that occurs, near the second termination point established by the second elongated hole 40 in the film (FIG. 4), the hook 43 will move the pressure pad to the left in FIG. 11, to the position shown, in which the ears 121 have moved out of engagement with the ledge 122, and upwardly under the influence of the spring 87. The ears 120 on the pressure pad 86 will come into engagement with the posts 114 and 115 forming a part of the nozzle 85, and the pressure pad 86 will swing up into engagement with the film 26 and carry the emulsion side of the film into coating engagement with the nozzle 85.

Next, assume that the first rewind operation is begun, by rotating the supply reel 51 clockwise in FIG. 5, to advance the teeth such as 168 towards the ledge 165 on the latch 160. Referring to FIG. 11, this motion will bring the hook 43 out of engagement with the end 119 of the pressure pad 86, as shown. The pressure pad will now urge the film 26 into coating engagement with the nozzle 85 under the influence of the spring 87.

As the pressure pad 86 is moved to the left, the detent 126 formed on the spring 87 will be disengaged by the hook 125. The purpose of the detent 126 is primarily to prevent premature movement of the pressure pad 86 in the housing prior to its positive disengagement from the initial position shown in FIG. 5 by the hook 43.

Referring next to FIGS. 5, 7 and 10, as the film 26 moves towards the supply reel 63, a pair of teeth 168 and 170 on the supply reel will engage the ledge 165, and the latch 160 will carry the sled comprising the pin 154 to the position shown in FIG. 10, detaching the tear-tab 99 in part from the receptacle 95 to allow the composition 96 to flow down into coating engagement with the nozzle and the film 26. The composition will then be uniformly coated on the emulsion side of the film 26 to a thickness determined by the doctor bar 104.

A doctor bar coater is preferred to other conventional forms of coaters for the purpose of coating the film, because it is inherently insensitive to changes in the viscosity of the processing composition and to changes in linear film speed with respect to the doctor bar, over a reasonable range that makes the process relatively insensitive to these variables. In particular, as is well known in the art in other contexts, a doctor blade or doctor bar coater inherently will lay down a uniform coating of one-half the distance between the doctor bar and the coated substrate under conditions in which a uniform meniscus can be formed on the coating liquid adjacent its interface with the substrate.

The coating operation begun with the parts in the position shown in FIG. 10 will continue until the composition 96 is substantially exhausted and the film is stored substantially all on the supply reel 63. Toward the end of that operation, the aperture 44 (FIG. 4) will approach and engage the hook finger 141 formed on the valve and cam assembly 88.

As the film 26 continues to move onto the supply reel, engagement of the aperture 44 in the film with the spring arm 141 will carry the film along the arm and downwardly, as suggested in FIG. 12, into the bight formed between the arms 141 and 142. Further movement of the film 26 towards the supply reel will carry the cam and valve member 88 to the right of the position shown in FIG. 12, causing the spring arms 143 and 145 to disengage the ledge 146, and bringing the cams 136 and 137 into contact with the base plate 117 of the pressure pad 86 in the region of the ears 121, with the cam assembly 88 being guided by the ears 121, as the assembly 88 moves to the position shown in FIG. 13.

During this movement, the end 133 of the cam and valve assembly 88 is guided by the ledge 147 formed on the wall extension 111 of the housing, and moves below the nozzle 85 towards a nozzle closing position. The pressure pad 86 begins to move downwardly, out of engagement with the film 26. The film is still held down out of its normal plane of movement by engagement with the bight formed between the spring arms 141 and 142.

Movement in this direction will continue to move the assembly 88 to the right, as it goes to the position shown in FIG. 13 in which the end 133 of the valve assembly 88 closes the nozzle 85 and the shoulders 135 formed on the assembly 88 engage the stops 114 and 115 formed on the nozzle 85. The lower spring arm 142 glides over and engages a stop 183, which may conveniently be formed integrally with the cover wall, to latch the cam assembly 86 against movement to the left as shown in FIG. 13.

During its movement from the position shown in FIG. 12 to the position shown in FIG. 13, the cam 136 disengages the contacts 148 and 149, and thus provides a signal indicating that the film has been processed.

FIG. 13 shows the final disengaged position of the processor parts, with the film 26 out of engagement with the hook elements 141 and 142. This position is attained when the film is again moved toward the takeup reel, as during projection of the processed film. When that occurs, the aperture 44 will disengage the arm 141, and the film will rise to its initial plane of movement, in which it is free of all of the elements of the processing apparatus, for subsequent cycles of projection and rewinding.

The nozzle 85 is now closed except for the small passage between the doctor bar and the upper surface of the valve end 133 of the assembly 88. Since this is quite a small aperture, on the order of several ten-thousandths of an inch, it will quickly be sealed by the evaporation of the vehicle from the processing composition, with concomitant drying and hardening of the composition in the gap. Contamination of the apparatus is further prevented by the fact that any leakage of processing compositon that may occur will be primarily upon the upper surface of the end 133 of the assembly 88, where it will be exposed to drying without further contact with the film.

Further details of the film drive and projection system 4 will next be described with reference first to FIG. 19. As there shown, the pocket 2 that is adapted to receive the cassette described above is, in part, formed in the housing 3 by two walls described above; i.e., the floor plate 6 and the wall 18 normal thereto, through which certain cooperating parts of the system extend. The pocket 2 is further defined by end walls 184 and 185, and a side wall 186 opposite the wall 18. Along the wall 186 are mounted a pair of suitably insulated contacts 187 and 188 that are adapted to engage the contact terminals 58 and 59 formed on the cassette.

The aperture plate 7 referred to above that is mounted on the floor plate 6 is shown in FIG. 19 to comprise a framing aperture 189 that defines the margins of the portion of the film in the cassette to be projected. Beside this aperture 189 is a slot 190 through which a film drive pawl, to be described, is adapted to protrude for engagement with film in a cassette in the pocket 2. Another symmetrical pair of slots 191 and 192 are formed in the aperture plate 7. These slots are adapted to receive a pair of pressure plate raising arms, to be described, which serve at times to disengage the pressure plate 78 of FIG. 5 from the film 26, for purposes to appear.

A floor plate 193 is formed integral with the housing 3, coplanar with the floor plate 6 and normal to the wall 18. On this plate 193 are mounted most of the operative parts of the film drive and projection apparatus to be described.

Energy for the film drive and projection apparatus is arranged to be supplied from a suitable source of alternating current, such as a 60Hz, 120 volt source, connected to a pair of terminals 194 and 195. One of these terminals is shown connected to a reference ground, for convenience, and the other is connected over contacts of an on-off switch S2 to mechanical and electrical power supply elements here shown schematically in FIG. 19 as a conventional DC power supply 202, and a conventional AC motor ACM. As will appear, the switch S2 is normally open, and is closed by the locator pin 181 when a cassette is inserted in the pocket 2 and the locator pin extends into the cassette to enable the tear-tab release mechanism and latch the cassette in the pocket.

The output shaft 197 of the motor ACM drives a fan schematically indicated at 198, and also drives the input side 199 of a conventional electromagnetic clutch having an output shaft 200. The shaft 200 is adapted to be driven from the shaft 197 through the clutch 199 when a clutch magnet CM is energized in a manner to appear.

The fan 198 supplies air for cooling a projection lamp, to be described, and may also be used to supply air to the cassette to aid in drying the film after it is coated with processing composition.

The power supply 202 provides DC voltages for energizing various other elements of the apparatus, as will appear. In particular, the power supply 202 is connected over leads schematically indicated at 203 to control circuits schematically shown at 204.

The control circuits 204 at times supply energizing current for the clutch magnet CM over a lead 205. Control inputs are provided to the circuits 204 by switches and cams schematically indicated at 206, over leads generally designated 207. The control circuits 204 at times provide energizing current over a lead 208 to energize a cassette ejector disabling solenoid SL1. Other circuits, schematically indicated at 209, affect the operation of a DC motor control circuit generally designated 210.

The DC motor control circuit 210 is also influenced by a motor reversing switch MR that performs its control function over leads schematically indicated as a single lead 211. The output of the motor control circuits 210, illustrated at 212, is supplied to energize a conventional DC motor DCM to cause it to rotate in either of two opposite directions, in a manner to appear.

The shaft 200, driven by the motor ACM when the clutch magnet CM is energized, serves as the main programming shaft for directing the operation of the film drive and projection system under the influence of mechanical and electrical signals supplied by the cassette. Auxiliary shafts schematically indicated at 213 are driven by the shaft 200, as will be described in further detail below. Also, a main cam shaft 215 is driven from the shaft 200 by means schematically shown in FIG. 19 as a pair of bevel gears 214.

The shaft 215 is supported in bearings schematically indicated at 216 and 217, fixed with respect to the plate 193. Carried on the shaft 215 are a number of cams, several of which control switches, to be described. In particular, the switches and cams 206 are driven by the shaft 215, and comprise a number of elements to be described below in conjunction with FIG. 44. Only those parts are shown in FIG. 19 which are conveniently displayed in fragmentary and schematic form, to illustrate the functional relationship between the elements of the system and indicate their relative location.

Two drive control cams 218 are symmetrically disposed on the shaft 215 and affixed thereto. These cams serve at times to drive a spindle plate 219 towards the wall 18.

The spindle plate 219 comprises a bar of metal or the like, provided with integral guide flanges 220 at its ends. The flanges 220 are slidable in ways, suggested at 221, formed integral with the walls 184 and 185.

The spindle plate 219 is normally urged to the position shown in FIG. 19 by a pair of compression springs 222 located between the wall 18 and the spindle plate 219. When so moved by the cams 218, the spindle plate moves toward the wall 18, where it may be latched at times by a stop 223, to be described below.

Also carried on the shaft 215 is a program disc 224 formed with three slots 225 disposed 120° apart on the disc. These slots serve to locate program stops, as shaft angles on the cam shaft 215, by engagement with a detent schematically shown at 226. The detent 226 comprises an element 227 adapted to engage the slots 225, and urged into engagement therewith by a spring 228. The spring 228 extends between the element 227 and a support 229 fixed to the plate 193.

A blinder control cam 230 is disposed on the shaft 215 and affixed thereto. It is arranged to operate a blinder generally designated 231 through a cam follower 232 formed integral with the blinder 231 and adapted to engage the cam 230. The blinder 231 at times interrupts the supply of light from a lamp, to be described. The lamp is disposed in a lamp housing generally designated 233 that is mounted on the plate 193 and communicates with the port 21 through which light is adapted to be admitted to a cassette in the pocket 2.

A motor control cam 234 is mounted on the shaft 215 and serves to control the position of the motor reversing switch MR. That relationship will be described below in more detail in connection with FIG. 44.

A snubber engaging cam 235 is fixed to the shaft 215. This cam at times drives a snubber stop 236 through the port 23 in the wall 18 for engagement with a snubber hub in a cassette inserted in the pocket 2. The snubber stop 236 is normally urged back into the port 23 by means of a spring 237 acting between the wall 18 and a collar 238 formed on the snubber stop.

A drive sprocket 239 for the supply reel of a cassette in the pocket 2, and a drive sprocket 240 for the takeup reel, are mounted on the spindle plate 219. These drive sprockets are adapted to protrude through the ports 19 and 20 in the wall 18 when the spindle plate 219 is driven toward the wall 18 by the cams 218.

The sprocket 239 is formed integral with a shaft 245. A collar 246 is formed integral with the shaft 245. Another collar 247 is detachably secured to the shaft 245 by means schematically shown as cooperating threads formed on the parts. This collar 247 may be integral with a splined extension 248 that engages corresponding splines 249 formed in a cylindrical bore in the end of a drive shaft 250.

The shaft 245 and the collars 246 and 247 cooperate with bearings schematically indicated at 251, mounted in the spindle plate 219 to allow the shaft 245 to rotate in the spindle plate, while preventing it from being translated along the axis of the shaft 245 with respect to the plate 219. The splines 249 and the splined extension 248 cooperate to allow the shaft 245 to be driven by the shaft 250, while allowing relative translational motion between the shafts 250 and 245. Thus, the shaft 250 may be fixed relative to the base plate 193 against translational motion, while rotatable with respect thereto.

The sprocket 240 may be rotatably mounted against translational motion in the spindle plate 219 by means identical to those just described with respect to the sprocket 239. A translational coupling is provided comprising splines 252 formed integral with the sprocket 240 and cooperating with splines 253 formed in a shaft 254, in the manner described above, to allow the sprocket 240 to be drivably connected to the shaft 254 while free to slide axially with respect thereto. The shaft 254 is also translationally fixed relative to the plate 193, but mounted for rotation thereon.

The shaft 250 is connected to one side of a conventional slip clutch 255, and the shaft 254 is similarly connected to one side of a conventional slip clutch 256. Each of the shafts 250 and 254 is at times driven through its associated slip clutch, and at other times is driven from the associated sprockets 239 and 240, as will appear.

A vaned ferromagnetic element 257 is mounted on the shaft 254 for rotation therewith, carrying its vanes past a conventional magnetic reed switch S5 such that the switch S5 is opened and closed a number of times during each revolution of the shaft 254. The swtich S5 provides an input signal to a motion detector, in a manner that will appear below.

The slip clutches 255 and 256 are arranged to be driven at times by the DC motor DCM through means next to be described. As schematically indicated, the motor DCM is provided with an output shaft 258. Mounted on the shaft 258 is another ferromagnetic element 259 provided with a plurality of vanes that are moved past a second conventional magnetic reed switch S4, such that the switch S4 is closed a number of times for each rotation of the shaft 258. The switch S4 serves as a feedback element for speed control of the motor 258, in a manner that will be described below.

Also driven by the shaft 258 is a bevel gear 260. The gear 260 drives a pair of shafts 261 and 262 in opposite directions through bevel gears 263 and 264, respectively. The shaft 261 is connected to one side of a conventional one-way clutch schematically indicated at 265, and the shaft 262 is connected to one side of a conventional one-way clutch 267.

When the shaft 261 is rotated in the direction of the arrow in FIG. 19, the clutch 265 will be engaged and drive the slip clutch 256 through a shaft 266. When the shaft 261 is rotated in the opposite direction, the clutch 265 will be disengaged. Similarly, when the shaft 262 is rotated in the direction of the arrow in FIG. 19, the clutch 267 will be disengaged. When the shaft 262 is rotated in the opposite direction, the clutch 267 will be engaged to drive the shaft 250 through the slip clutch 255 by means of an intermediate shaft 268.

The foot pedal 25 mounted adjacent the floor plate 6 in the pocket 2 will next be described in its relation to the locator pin 181, with reference to FIGS. 19 and 20. As best shown in FIG. 20, the foot plate 25 is provided with a downwardly depending arm 269 which extends through a suitable aperture in the floor plate 6 to a transverse arm 270, formed integrally with the foot plate 25 and the arm 269, and extending over beneath the wall 18 to an upwardly extending arm 271.

The arm 271 extends up through a suitable aperture in the base plate 193 to an end 272 formed integrally therewith. The end 272 is connected to a lever 273. The lever 273 is spaced at one end from the base plate 18 by means of a conventional spacer 274, and is pivoted to the wall 18 by a pin 275. At the opposite end, the lever 273 is formed with upstanding yoke arms 276 that surround the port 22, through which the locator pin is adapted to protrude in the position of the parts shown in FIG. 20.

The lever 273 is spaced from the wall 18 at the end adjacent the yoke arms 276 by a spacer 277 secured to the wall 18. When the foot pedal is depressed, the arm 273 is rotated to carry the yoke arms 276 out of the way of the recess 22, for purposes to appear. The lever 273 and interconnected parts, including the foot pedal 25, are urged into the position shown in FIG. 20 by a spring 278 secured to the base plate 193 by means schematically indicated at 279.

Referring next to FIG. 21, the locator pin 181 is formed integral with a collar 280 that engages the yoke arms 276 in the position of the floor plate 25 shown in FIG. 20 and described above. The pin 181 is urged toward the port 22 by a spring 281 compressed between the collar 280 and a support 282 affixed to the floor plate 193 and slidable with respect to the pin 181.

A second collar 283 is formed on the end of the locator pin 181, and is adapted to operate the switch S2, to close a pair of normally open contacts thereon, when the pin 181 moves through the port 22. As noted above, the contacts of the switch S2 control the supply of power to the system.

The collar 283 is also adapted to engage a yoke 284. The yoke 284 is out of engagement with the collar 283 in the position of the parts shown in FIG. 21, assumed when the system is in its standby condition and no cassette is located in the pocket 2.

The yoke 284 is formed integral with a lever 285. The lever 285 is pivoted to a cam following lever 286 by means of a pivot pin 287 formed integral with the lever 286, and is detachably connected to the lever 286 by a second pin 288 that is at times removable by withdrawing it through an aperture 294 in the lever 285 in which it is shown in FIG. 21, to allow the lever 285 limited freedom of movement, independently of the lever 286.

The lever 286 is pivoted on a support housing 289, in a manner and for purposes to appear. A cam follower 290 is formed at the end of the lever 286, and is adapted to engage a cam 291 fixed to the cam shaft 215. The follower 290 is resiliently urged into engagement with the pin 291 by a spring 292 having one end fixed in a suitable support 293 formed integral with the base plate 193.

FIGS. 22 and 23 show the levers 285 and 286 in more detail. In particular, the form of the yoke 284 is shown in FIG. 22, and the pivot pin 287, which protrudes through an aperture 307 in the lever 285, is shown in FIG. 23 as being formed integral with the lever 286.

Referring next to FIGS. 24 and 25, the mounting housing 289 for the cam following assembly just described comprises a mounting flange 296 secured to the base plate 193 by any conventional means, here shown as screws 310. Formed integral with the base flange 296 is a lower cylindrical housing part 297 that is threaded at 298 into engagement with an upper generally cylindrical housing part 299.

A bore 300 in the upper portion 299 of the housing receives a pivot pin 295 that extends through an aperture 308 in the lever 286. Protruding through a central bore in this pivot pin 295 is the movable connecting pin 288 for the lever 285.

Formed at the lower end of the pin 288 is a collar 301 slidable in a bore 302 formed in the housing parts 297 and 299. The collar 301 is urged upwardly to the position shown by a spring 303 compressed between the collar 301 and the coil 304 of a solenoid SL2 having a core 305.

The leads 311 of the coil 304 extend downwardly through corresponding apertures formed in the flange 296 and the base plate 193. It will be apparent that when the solenoid SL2 is deenergized, the pin 288 will engage the recess 307 in the lever 285, and the lever 285 will move as one with the lever 286. On the other hand, when the solenoid SL2 is energized, the pin 288 will be retracted, allowing the lever 286 to move relatively independently of the lever 285, although the latter is still carried with it on the pin 287.

As suggested in FIG. 24, the cam 291 has three principal positions, 120° apart in terms of the angle of the shaft 215, and labelled O, P, and D/R. Mnemonically, these positions may be considered the OFF position, the PROJECT position, and the DEVELOP/REWIND position. They are sequentially assumed during operation of the apparatus, beginning with the location O in engagement with the cam follower 290, and then going sequentially to the positions P and D/R, and finally back to O, in the direction of the arrow shown in FIG. 24.

The relationship of these detented shaft angles to other functions performed in the apparatus will be described below. However, so far as the locating pin goes, the positions of the parts assumed when the point on the cam labelled O engages the cam follower 290 are shown in FIGS. 21 and 26. FIG. 21 shows the position assumed when no cassette is in the pocket 2, as described above. In that position, the cam 291 has moved the levers 285 and 286 to an idle position in which the yoke 284 is out of engagement with the collar 283 on the pin 181.

When a cassette is placed in the pocket 2, the floor pedal 25 is depressed and the yoke arms 276 move down out of engagement with the collar 280 on the pin 181, allowing the pin 181 to enter and protrude through the recess 22 in the plate 18 as shown in FIG. 26. The contacts of the switch S2 are now closed by the collar 283, and the collar 283 moves into adjacent relationship to the yoke 284.

The cam 291 is initially in the OFF position shown in FIG. 26. As shown in FIG. 24, the cam 291 can rotate from the OFF position, and through the PROJECT and DEVELOP/REWIND positions, without effecting a displacement of the cam follower 290 in FIG. 26. However, as the cam 291 moves from the D/R position to the O position, the cam follower 290 will be actuated to rotate the lever 286 clockwise as seen in FIG. 26, to the position shown in FIGS. 27 and 28. Whether or not the locating pin 181 will be actuated by this movement will depend on whether or not the solenoid SL2 in FIG. 25 is energized. If it is energized, to retract the pin 288, the cam 286 will move independently of the cam 285, allowing the pin 181 to remain in the position engaging the cassette, and causing relative movement of the parts as shown in FIG. 27.

The aperture 294 in the lever 285 that is adapted to receive the pin 288 is now moved out of position to engage the pin. As the cam 290 moves through the position shown in FIG. 24 to the OFF position, the cam follower 290 will return to the position shown in FIG. 26. It will remain in that position as the cam 291 rotates through the O, P, and D/R positions. As the parts return to the position shown in FIG. 26, if the solenoid SL2 in FIG. 25 is deenergized, the pin 288 will reenter the aperture 294, again fixing the lever 285 to the lever 286.

If the solenoid SL2 is not energized as the cam 291 moves from the D/R position to the O position, the levers 285 and 286 will move together to the position shown in FIG. 28. The lever 285 will retract the pin 181 by engagement of the yoke 284 with the collar 283, causing the pin 181 to be withdrawn and the switch S2 to open its contacts.

Referring next to FIG. 19 in conjunction wuth FIGS. 29–32, the construction of the lamp housing blinder 231 will next be described. As best shown in FIGS. 29 and 32, the cam follower 232 that engages the cam 230 is connected over integral arms 316 and 317 to a blade 315 of the blinder 231. This cam follower and blade assembly is pivotally mounted to the wall 18 by means of a pivot pin 325, for rotation between the position shown in FIG. 29 and the position shown in FIG. 30. In the latter position, the blade 315 closes a port in the housing 233 communicating with the port 21, by entering a slot 319 formed in the lamp housing. The lamp housing is secured to the base plate 193 by a mounting flange 318 and suitable cooperating fasteners indicated schematically at 326 in FIG. 19.

The blinder assembly 231 is urged into engagement with the cam 230 by means of a spring 320 engaging the arm 317, and fastened at its other end to the under side of the base plate 193 by means shown schematically as fasteners 321. The spring 320 extends up into contact with the arm 317 through a suitable aperture 322 formed in the base plate 193.

As best shown in FIG. 31, the lamp housing 233 is provided with vents 323 to allow the escape of heated air from the housing, produced by energization of a projection lamp K that is mounted in the housing in any suitable conventional way, not shown in detail. An inlet conduit 324 is provided to admit forced air from the fan 198 in FIG. 19, by means of suitable intermediate ducting. Alternatively, the lamp housing wall members may be so formed and interconnected as to comprise the necessary conduit conducting the air from the fan to the inlet of the housing.

As shown in FIG. 32, the cam 230 is arranged to close the blinder 231 in the D/R position of the cam on the shaft 215. The blinder is open in the O and P states of the apparatus, and in intermediate positions. It will be apparent that locating the blinder in the outlet of the lamp housing makes it unnecessary to provide light-baffling for the air inlet and outlet vents in the housing.

Referring next to FIGS. 19 and 33–36, the cassette ejecting mechanism comprises an eject enabling plate 327 slidably mounted in the floor 6 of the pocket 2. The plate 327 is hinged, as schematically indicated at 328 in FIG. 19, by means of a hinge pin 329 shown in FIG. 33, to a connecting plate 330 having an extension 331 that is connected to the armature 332 of the solenoid SL1. The assembly is urged into the position shown in FIG. 19 by a spring 333 extending between the end of a slot formed in the base plate 193 and the extending end 331 of the hinged eject enabling plate assembly.

The plates 327 and 330 are slidably mounted in a slot 334 formed in the base plate 193, and in the portion thereof comprising the floor plate 6 of the pocket 2, on ways schematically indicated at 335. The hinged end plate 327 is thus enabled to move from the position shown in 333, in which a cam admitting slot 336 in the floor plate 6 is exposed, to the position shown in FIG. 36, in which the end plate 327 covers the aperture 336.

An eject cam 337 is mounted on a shaft 213a, comprising one of those auxiliary shafts 213 rotatable with the shaft 200 and schematically indicated in FIG. 19. As will appear in connection with the description of FIG. 44 below, the eject cam is adapted to move to the position shown in FIG. 33 between the D/R and O positions of the cam shaft. In the position shown in FIG. 33, with the solenoid SL1 energized and the end plate 327 moved to the position shown, the cam 337 can enter the slot 336 and rotate through a full revolution without contacting the bottom of a cassette 1 inserted in the pocket. However, as shown in FIG. 35, should the cam be rotated to its ejecting position when the solenoid SL1 is deenergized, the hinged end plate 327 will overlie the aperture 336, such that when the cam 337 rises to the position shown in FIG. 35, the end plate 327 will be hinged up and eject the cassette 1.

FIG. 36 shows the cam 337 in positions other than the ejecting position between the D/R and O positions, and the relationship of the hinge plate 327 thereto when the solenoid SL1 is deenergized.

The stop 223 mentioned briefly above in connection with FIG. 19 is adapted to be erected when the solenoid SL1 is energized, by means shown in FIGS. 33 and 34. Specifically, a cam follower 342 is adapted to be engaged by the plate 330 when the solenoid SL1 is energized. The follower 342 is connected over an arm 339 forming a part of a lever 338 to the stop 223. The arm 339 is provided with a mounting aperture 341 whereby it is pivoted by a pivot pin 340 to a suitable stop 343 formed integral with the plate 18.

When the cam follower 342 is depressed by the plate 330 in the energized condition of the solenoid SL1, the stop 223 rises into position to interfere with a stop 344 formed on the spindle plate 219. The spindle plate 219 is shown schematically in FIG. 34, and the apertures 345 and 346 are those into which the drive sprockets 239, for the supply reel, and 240, for the takeup reel, together with their associated shafts and bearings, are mounted.

As shown in FIG. 35, in the deenergized condition of the solenoid SL1, the spindle shaft 219 and its integral stop 344 can move back and forth between the position shown in full lines, and the position 344' shown in dotted lines, without interference by the stop 223. As will appear, the cams 218 in FIG. 19 are arranged to move the spindle plate 219 past the stop 223 before the solenoid SL1 is energized, allowing the stop 344 to pass over the stop 223 before it is erected, in the event that it is erected by energization of the solenoid SL1 in a manner yet to appear.

FIGS. 37, 38 and 39 show the pressure plate lifting mechanism. FIG. 37 shows a pressure plate lifting yoke generally designated 348 that comprises a pair of levers 349. Each of the levers 349 has an outer pressure plate lifting arm 350 formed at the end thereof, and an inner pressure plate lifting arm 351 formed intermediate its ends.

An aperture 352 is provided in each of the levers 349 by means of which the lifter yoke 348 can be journalled for rotation on the floor plate 6 by means of a pivot pin 353 extending through the apertures 352 and through a suitable support 354 formed integral with the plate 6. The levers 349 are thus adapted to pivot between the position shown in FIG. 38, in which they are out of engagement with the pressure plate 78 of a cassette 1 inserted in the housing and registering with the aperture plate 7, to the position shown in FIG. 39, in which the arms 350 and 351 raise the pressure plate 78 above the plane of the film 26. It should be noted that raising of the pressure plate 78 to the position shown in FIG. 39 interrupts the light seal previously provided at the film gate. However, the film in the cassette 1 remains protected against light at this time by the aperture plate 7, the walls of the pocket 2, and the end flange 17 on the cassette.

The levers 149 are joined by an integral plate 355 that serves as a cam follower, cooperating with a cam 356 that is fixed to a cam shaft 213b, comprising another of the auxiliary shafts 213 indicated schematically in FIG. 19, and rotating in unison with the main cam shaft 215 and its drive shaft 200. As indicated in FIGS. 38 and 39, the cam 356 is arranged to raise the levers 349, lifting the pressure pad, in the D/R position of the cam shaft. The purpose is to eliminate unnecessary drag on the film 26 during processing, when the film is being drawn through the coating station, and during rewinding for storage, when a relatively high rewind speed and minimum friction are desirable.

As indicated in FIGS. 2 and 38, a blinder block 8 is mounted underneath the floor plate 6 of the cavity 2 beneath the aperture plate 7. The block 8 is provided with an aperture 357 sufficiently larger than the aperture 189 in the aperture plate 7 so that it will not limit the light transmitted through the film. A transverse slot 358 is formed in the block 8, to admit a blinder, next to be described in connection with FIGS. 40-41.

As shown in FIG. 40, the blinder 359 is formed on one end of a bell crank generally designated 360. The bell crank 360 has another arm 361, and at the juncture of these arms a pivot pin 362, secured to a suitable mounting post 363 formed integral with the floor plate 6, mounts the bell crank 360 for rotation in the housing for movement between the position shown in FIG. 40, in which the blinder closes the aperture 357, and the position shown in FIG. 41, in which the aperture is opened.

The arm 361 carries a cam follower 364 that engages a cam 365. The cam 365 is mounted on the cam shaft 213b, with the cam 356 described above in connection with FIG. 38.

The cam follower 364 is urged into engagement with the cam 365 by a spring 366. The spring is mounted between a pair of pins 367 and 368, secured in turn to the floor plate 6 as suggested in FIG. 42. As is also indicated in FIG. 42, the cam 365 is arranged to close the blinder 359 simultaneously with the closure of the blinder 315 for the lamp housing 233, described above in connection with FIGS. 29–32. When both of these blinders are closed, and a cassette is inserted in the pocket 2, the portion of the film exposed in the film gate of the cassette is thus surrounded by a lighttight housing, in which the film may be processed by appropriate actuation of the supply and takeup reel described above.

FIG. 43 schematically illustrates the film advance pawl mechanism. The apparatus comprises a pair of film drive pawls 369 and 370 formed on a lever generally designated 371. The pawls 369 and 370 are adapted to engage sequential sprocket holes 38, to advance the film incrementally. For that purpose, the lever 371 is pivoted as indicated at 372 to a crank arm 373. The crank arm 373 is fixed to a shaft 197a that is at times driven synchronously with the shaft 197 of the AC motor ACM in FIG. 19.

As shown, the lever 371 passes through a suitable aperture 376 formed in the floor plate 6, and thence through the slot 190 in the aperture plate 7 into engagement with the film. An end 374 formed on the lever 371 rides on a pin 375 secured to the floor plate 6. Thus, as the crank 373 rotates, the pawls 369 and 370 drive the film 26 to the left in FIG. 43 until they are brought down out of engagement with the film in response to rotation of the crank arm 373. Thereafter, the pawls are brought up beneath the plane of the film, as suggested by the dotted lines in FIG. 43, back to a position in which they can engage the next pair of sprocket holes 38, and then undergo another advance stroke. A projection 402 formed on an extension 403 of the hub of the crank arm 373 is adapted to releasably engage a detent 404 urged against the hub 403 by a spring 405 compressed between the detent 405 and a fixed support 406. That causes the pawl to stop in the dotted line position, out of engagement with the film, when the drive for the shaft 197a is disengaged.

As described above, when the pawls 369 and 370 engage an elongated sprocket hole such as 39 in FIG. 4, the film will continue to be advanced. However, when a further elongated sprocket hole, such as 40 in FIG. 4, is encountered, having a spacing equal to three of the sprocket holes 38, both pawls 369 and 370 will fail to engage the film, and film advance will cease, even though the shaft 197a continues to rotate. The shaft 197a is arranged to be driven at times by the shaft 197 of the AC motor ACM, through a selectively energizable transmission to be described below in connection with FIG. 45.

Referring next to FIG. 44, there is shown the set of cams and cam actuated switches comprising the programming apparatus for the film drive and projection system. For simplicity, the shaft driven by the electromagnetic clutch comprising the winding CM, shown in FIG. 19 as the shaft 200, the main cam shaft 215, and the auxiliary shafts schematically indicated at 213, are represented as a single shaft 376 arranged to be driven by the motor ACM from the shaft 197 when the clutch magnet CM is energized.

The various cams are shown schematically in FIG. 44 as disposed on the shaft 376 in their cooperative relationship, each shaft being shown in the position corresponding to the OFF position and labelled O. As noted above, the cam shaft has three dwell positions 120 degrees apart, including the OFF position O, the PROJECT position P, and the DEVELOP/REWIND position D/R. Other functions are performed between these dwell positions, as will appear.

All of the cams are adapted to rotate in the direction of the arrows, when the shaft 376 is driven by the clutch. The registry of the cam shafts 376 at the dwell positions is insured by the detent 227 engaging one of the notches 225 in the program disc 224. In practice, the clutch magnet CM is energized until the cam shafts near this position, and system inertia carries the shafts and their associated cam followers into the detented dwell position under the influence of the detent 227.

The apparatus includes seven cam controlled switches. One of these is a cassette sensing switch CS controlled by a cam 377 that is open in the O position of the apparatus and closed from a position approaching the P position to a position after the D/R position. When this switch is closed, the terminals 58 and 59 on the cassette 1 (FIG. 5) are interrogated to determine whether or not the film in the cassette has been processed.

A jam reset switch JR, having a function to be described, is controlled by a cam 378. The switch JR is closed between each of the dwell positions O, P, and D/R, and opened at the dwell positions.

The DC motor reversing switch MR comprises two transfer contacts a and b that engage back contacts, as shown, in the OFF and D/R positions, and front contacts in the P position. Circuits controlled by these contacts cause the DC motor to run, when energized, in a first direction in the P position, and in an opposite direction in the D/R position. Either position of the contacts could be assumed in the O position.

A PROJECT switch P comprises four contacts a, b, c, and d, each closed in the P position of the apparatus by a cam 381, and open in other positions of the apparatus. Contacts of this switch close various circuits effective in the PROJECT mode of operation, as will appear.

An $\overline{OFF}$ switch labelled $\overline{O}$ is opened in the OFF position, and closed in other positions of the apparatus. This switch has three contacts a, b, and c, which control circuits to be described in positions other than the OFF position.

Another cam 382 closes a switch labelled O in all positions of the apparatus except the P and D/R dwell states. Closure of this switch is effective to maintain energization of the clutch magnet CM, as will appear, and signifies by its closed state that the apparatus is not in either of the PROJECT or D/R dwell positions.

A cam 379 controls two contacts labelled Da and Db, each closed in the D/R position of the apparatus. A contact labelled $\overline{D}$ is closed in all positions except the D/R position, and is open in that position, for purposes to appear.

The spindle cams 218, snubber cam 235, blinder cams 230 and 365, locator pin withdrawal cam 291, eject cam 337, and pressure plate lifter cam 356, all described above, are shown in FIG. 44 in their cooperative relation to the cam control switches and the program disc just described. The various states assumed as the cam shafts schematically indicated at 376 are rotated will be discussed below in more detail in connection with the operation of the system.

Referring next to FIG. 45, there is shown a schematic block and wiring diagram illustrating the cooperative relationship between a cassette 1 inserted in the pocket 2 (FIG. 1) and selected elements of the electromechanical film drive and projection system.

As briefly described above, the power supply 202 and the AC motor ACM are arranged to be energized over the AC line terminals 194 and 195 when a switch S2 is closed. The contacts of this switch are closed when the locator pin 181 is inserted into the port 16 of a cassette 1 inserted in the pocket 2 of the film drive and projection system. As indicated in FIG. 45, the switch S2 is paralleled by a contact $\overline{O}a$ that is closed except when the apparatus is in the OFF position by the cam 380 in FIG. 44. This switch contact, and others shown in FIGS. 44, 45, 46, and 47, to be described, are shown in the OFF position.

The power supply 202 may be any conventional means for converting alternating current to direct current. It serves to provide two regulated DC potentials B1 and B2 that are positive with respect to ground. For example, the voltages B1 and B2 may be 12 volts and 9 volts, respectively.

The drive shaft 197 of the AC motor ACM drives the clutch energized at times by the clutch magnet CM, referred to above. When the clutch magnet is energized, the input cam shaft 200 rotates to cause rotation of the other cam shafts described. The output shaft 197 of the motor ACM also drives the auxiliary shaft 197a connected through the crank 373 to the film advance pawl 371, when a clutch schematically indicated at 385 is energized. The shaft 197a also drives a conventional shutter 9, by conventional means here shown as a bevel gear 391 driven by the shaft 197a, a bevel gear 392 driven by the gear 391, and gear 393 formed integral with the gear 392, and a shutter drive gear 394 forming a part of the shutter 9.

The clutch 385 is energized at times when a solenoid SL3 is energized. The armature 390 of the solenoid SL3 is connected to a pulley 389, such that when the solenoid SL3 is energized, a belt 388 is tightened to complete a drive connection between a pulley 386, driven by the shaft 197, and a pulley 387, connected to the shaft 197a.

When a cassette 1 is inserted in the system, so that the locator pin 181 enters the port 16 in the cassette and closes the switch S2, the external terminals 58 and 59 on the cassette are conditioned for interrogation by a circuit which extends from the supply terminal at B1, through a first resistor R2, over the terminals 187 and 188 which engage the terminals 58 and 59, and thence through a resistor R3 to ground.

The resistor R2 is selected to limit the current flowing through the contacts 187 and 188 and the terminals 58 and 59, when the latter are internally bridged as described above, while allowing the full supply voltage B1 to be used to interrogate the contacts. That is because the resistance presented by the terminals 58 and 59 may be initially relatively high, owing to dry contact resistances that exist in thin films across the contacts, and which are greatly reduced when current is established.

The resistor R3 is selected in value to establish a suitable control potential across it, when the terminals 58 and 59 are bridged within the cassette 1, to energize a relay RK. The relay RK is energized when the cassette terminals 58 and 59 are bridged, and the interrogation switch CS is closed. That establishes a pickup circuit for the relay RK.

Once energized, the relay RK completes a stick circuit including its own front contact $a$, and contact $\overline{O}b$, closed except when the apparatus is in the OFF position. The stick circuit extends from the supply terminal at B2, a lower voltage than the voltage B1, over contact $\overline{O}b$, front contact $a$ of the relay RK, and thence through the winding of the relay RK to ground.

The projection lamp K is at times energized over a lead 400 connected to the supply terminal at B1. This circuit extends from the lead 400 through the filament of the lamp K, and thence over the contact P$a$, closed when the apparatus is in its PROJECT state, and back contact $c$ of the relay RK, closed when the relay is de-energized, to ground.

The solenoid SL1, which actuates the cassette enabling plate 327 in FIG. 19 and also effects the positioning of the stop 223 for the spindle plate described above, and the solenoid SL2 which, when energized, disables the cassette locating pin withdrawal mechanism, are energized in parallel over a front contact $b$ of the relay RK, closed when it is energized. A circuit for the energization of the pawl and shutter drive control solenoid SL3 is completed when the contact P$b$ is closed in the PROJECT state of the apparatus.

A diode D6 is connected in parallel with the clutch winding CM for the conventional purpose of protecting the winding against transients. An energizing circuit for the clutch magnet extends from the power supply terminal at +B1, through the winding of the clutch magnet, and thence over three selectively effective parallel paths. The first extends over contact $\overline{O}c$, closed except when the apparatus is in its OFF state, and thence over the contacts of the switch S1, closed except when a cassette 1 is inserted in the housing. This circuit serves to return the film drive and projection system to its OFF state when no cassette is present and the system is not in its OFF state. The power supply voltage is maintained under these conditions by contact $\overline{O}a$.

The second circuit for the clutch magnet CM is completed over the contact O, closed when the apparatus is in its OFF state. That circuit is effective to drive the apparatus through its OFF state only if the locator pin 181 has not been withdrawn as the apparatus nears its OFF state to open the power supply contacts S2. If that has occurred, both the power supply input switch S2 and the parallel contact $\overline{O}a$ will be opened, as the apparatus enters its OFF position.

The third circuit which at times energizes the clutch magnet CM comprises the output circuit of a motion detector generally designated 395, which responds to the actuations of the reed switch S5, described above, to produce a signal when shaft motion driving either the takeup or supply reel in the cassette 1 ceases because the film has reached one of its terminal positions in the cassette. The motion detector circuit will be described in more detail below in connection with FIG. 46.

Contacts of the relay RK are effective in both the circuit for the motion detector 395, and in the DC motor control circuit 210, both of which will next be described in connection with FIGS. 46 and 47. Referring first to FIG. 46, the motion detector comprises an NPN transistor Q2, used as a switch, which has its collector connected through the winding of the clutch magnet CM to the supply terminal at B1, as shown in FIG. 45.

The emitter of the transistor Q2 is connected to ground. When its base is forward biased with respect to the emitter, the transistor provides a ground level current sink to allow current flow through the clutch magnet CM.

Forward bias for the base of the transistor Q2 is at times provided when a capacitor C3 is charged sufficiently to break down a zener diode D7 in the reverse direction. For this purpose, a circuit extends from the base of the transistor Q2 through the zener diode D7 in the forward direction, and thence through the capacitor C3 and a resistor R4 to ground.

The capacitor C3 at times receives charging current through one of three paths. A first extends over back contact d of the relay RK, closed when the relay is deenergized, and thence through a resistor R5 in parallel with a resistor R6, through the capacitor C3, and the resistor R4 to ground. An alternate circuit involving the same charging time constant is effective when contact Pc is closed, in the PROJECT state of the apparatus. That circuit extends from the supply terminal at B1 over the contact Pc, and through the resistor R5, capacitor C3, and resistor R4 to ground. Both of these circuits provide the same time constant, and for example, a time constant of approximately three seconds before the capacitor C3 is charged enough to break down the diode D7 and bias the transistor Q2 into conduction.

A longer time constant circit is at times effective. This circuit extends from the supply terminal at B1, through the resistor R6, and thence through the capacitor C3 and resistor R4 to ground.

The time constant (R4+R6)C3 may be, for example, effectively about ten seconds before the diode D7 is broken down to bias the transistor Q2 into conduction.

A discharge circuit for the capacitor C3 is provided by an NPN transisotr Q3, serving as an electronic switch. The collector of the transisotr Q3 is connected to the junction of the resistor R6 and R5 and the capacitor C3. The emitter is connected to ground.

The base of the transistor Q3 is connected to two selectively effective control circuits. A first extends from the supply terminal at B1 through the jam reset contact JR, closed between the dwell positions of the apparatus, and thence through a resistor R7 and a resistor R8 to ground. The junction of the resistors R7 and R8 is connected to the base of the transistor Q3. When the jam reset contact JR is closed, the transistor Q3 is biased into conduction to discharge the capacitor C3.

A second control circuit for the transistor Q3 involves a first series path extending from the supply terminal at B1 over the contacts of the reed switch S5, and thence through a resistor R9 and a resistor R10 in series to ground. The junction of the resistors R9 and R10 is connected to the base of the transistor Q3 over a circuit which includes a capacitor C4 in series with a resistor R11. As long as the switch S5 remains open, this circit is ineffective. However, when the switch S5 is repeatedly closed and opened, the capacitor C4 will be intermittently charged and then discharged.

The capacitor C4 is charged when the switch S5 is closed over a path including the resistor R9, capacitor C4, resistor R11, and resistor R8. When the contacts of the switch S5 are opened, the capacitor will discharge through the resistors R10, R8, and R11.

The time constants are selected such that when the switch S5 is repeatedly closed and opened, at any of the rates used to drive the takeup or supply reels of the cassette 1, sufficient bias will be maintained across the base-emitter junction of the transistor Q3 to keep it in conduction, keeping the capacitor C3 in a discharged condition. However, when the switch S5 stops repeatedly opening and closing, either in an open state or a closed state, no bias will be provided. In the open state of the switch S5, the capacitor C4 will not be charged. In the closed state of the switch S5, the capacitor C4 will charge to essentially the supply potential at B1, but no current will flow through the resistors R11 and R8 after the capacitor has reached this terminal value.

To briefly summarize the operation of the motion detector, assume that the capacitor C3 is in its discharged state. Absent the effects of the contacts JR and S5, the capacitor C3 will be charged, over a three second interval, if either the relay RK is deenergized or the project contact Pc is closed, or with a ten second time constant, if these contacts are both open, to break down the zener diode D7 and bias the transistor Q2 into conduction. When the transistor Q2 conducts, the clutch magnet CM will be energized, and thereby drive the apparatus to its next dwell position. As the apparatus moves toward that position, the jam reset contact JR will be closed, biasing the transmitter Q3 into conduction and discharging the capacitor C3 to prepare it for operation in the next dwell position.

At a dwell position such as P or D/R calling for the operation of the DC motor DCM, once the motor is in operation to drive either the takeup or the supply reel, the switch contacts S5 will be repeatedly closed and opened, preventing the capacitor C3 from charging until motion of the film drive shaft has stopped. That will allow the apparatus to remain in its current dwell position until the film has been transported to the extreme position towards which it is being driven. Thereafter, with an appropriate delay selected by the contacts of P and RK, the transistor Q2 will conduct again to allow the apparatus to be driven to its next dwell position.

Referring next to FIG. 47, the motor control circuit for the DC motor DCM comprises a drive current supply circuit for the winding of the motor that extends from the supppy terminal at B1, over one of the motor reversing contacts MR selected by the position of the motor reverse control cam 234 in FIG. 44, through the winding of the motor, and thence over the other contact MR to the collector of an NPN power transistor Q4. The emitter of the transistor Q4 is connected to ground. When the transistor Q4 is biased into conduction by an appropriate signal applied to its base in a manner to be described, the motor will run in the direction selected by the current position of the contacts MR.

The base of the transistor Q4 is controlled by a summing amplifier consisting of two complementary transistors Q5 and Q6. The transistor Q5 is a PNP transistor, having its emitter connected to the supply terminal at B2. The collector of the transistor Q5 is returned to ground through a resistor R12. The collector of the transistor Q5 is also connected to the base of the transistor Q6, which is an NPN transistor. The collector of the transistor Q6 is connected to the supply terminal at B2, and its emitter is returned to ground through a resistor R13. The emitter of the transistor Q6 is also connected to the base of the transistor Q4 through a resistor R14.

It will be apparent that a negative signal applied to the base of the transistor Q5 with respect to its emitter will bias the transistor Q5 into conduction to allow a current flow depending upon the magnitude of the biasing signal that will be divided between the emitter-collector junction of the transistor Q5 and the resistor R12. A corresonding positive signal with respect to ground will be supplied to the base of the transistor Q6, having an amplitude depending on the magnitude of the current passed by the transistor Q5, to allow a corresponding current flow between collector and emitter of the transistor Q6 that will produce a bias signal across the resistor R13 enabling the transistor Q4 to conduct current. The nature of the current signal supplied to the base of the transistor Q5 depends on the state of the control apparatus, and on a motor speed feedback control circuit, next to be described.

In accordance with the embodiment of the invention illustrated, the DC motor DCM is required to perform in three basic modes. A first is employed in those conditions of the apparatus in which it is desired to advance film onto the takeup reel of a cassette. That is done in the PROJECT state of the apparatus, with contact P*d* closed. The relay RK may or may not be energized, as will appear. In either case, one of its contacts RK*g* and RK*e* will be open.

The motor DCM is operated under those conditions at a fixed low speed, without feedback, to supply drive power to the takeup reel through the slip clutch 256 in FIG. 19. Actual motion of the film is under the control of the drive pawl at this time, with the snubber roll stopped. Accordingly, no feedback is required to control the film speed.

The energizing circuit for the transistor Q5 extends in that case from the supply terminal at B2 through a resistor R15 in series with a resistor R16 to ground. The voltage appearing across the resistor R16 is applied to the base of the transistor Q5 through an adjustable resistor R17 and over the contact P*d*, closed in the PROJECT state of the apparatus.

A second requirement on the motor DCM is that it run at a relatively rapid speed to rewind film for storage after it has been projected. Film speed is not critical under these conditions, and motor speed feedback control is not required. A simple motor control circuit thus extends from the junction of the resistors R15 and R16 over the back contact RK*g* of the relay RK, closed when the relay is deenergized, and over the contact D*b*, closed in the D/R mode of the apparatus, to the base of the transistor Q5. Current flowing at this time to the base of the transistor Q5 is larger because the resistor R17 is not in the circuit, as it is in the project mode just described.

The most complex mode of operation required of the motor DCM is in the state of the apparatus in which it is desired to develop unprocessed film upon first rewinding of the film from the takeup reel to the supply reel. It will be recalled that processing is begun in the cassette by first enabling the tear-tab mechanism when the locator pin 181 is inserted, and continued by erecting the pressure pad when the film is advanced from the exposure termination point to the termination point established by the second elongated sprocket hole 40 in FIG. 4.

Upon the first rewinding motion, the enabled tear-tab release mechanism is actuated, to detach the tear-tab and allow processing composition to flow down into the coating nozzle. In order to give that process time to occur, it is desired first to strip a piece of film onto the supply reel, sufficient to allow the tear-tab to be detached, and then wait for a short interval before beginning the processing rewind motion, during which the film is coated with processing composition. Both to avoid jerking of the processor parts during the first stage of this operation, and to assure a fixed linear speed of the film past the coating station during the processing portion of the operation, speed control of the DC motor DCM is desirable.

As will appear, the relay RK is energized during the processing operation. That causes its front contact RK*e* to be closed, preparing a speed control feedback circuit that includes the magnetic reed switch S4. As noted above, the reed switch S4 is periodically opened and closed during rotation of the shaft 258 of the DC motor by rotation of the ferromagnetic vanes 259 past the reed switch S4 to periodically close it, and then allow it to open as each vane passes.

When the relay RK is energized and the contacts of the switch S4 are closed, a charging circuit for a capacitor C5 is completed that extends from the supply terminal at B2 through a diode D8, through the capacitor C5, and through the contacts of the switch S4 and front contact RK*e* to ground. When the switch S4 is momentarily opened, the capacitor C5 will charge a capacitor C6 through a circuit extending through a diode D9, a resistor R19, the capacitor C6, and a resistor R18, and thence back to the capacitor C5.

The lower terminal of the capacitor C6 will thus become positive with respect to its upper terminal as seen in FIG. 47. This positive voltage component, having an amplitude determined by the speed of the shaft 258, will be supplied through a resistor R20 and over contact D*b*, closed in the DEVELOP position of the apparatus, to the base of the transistor Q5.

A decaying voltage signal that is negative with respect to the emitter of the transistor Q5 is at times applied to the base of the transistor Q5 through a circuit next to be described. This circuit comprises a path extending from the supply terminal at B2 through two resistors R22 and R23 in series to ground. During the time when the apparatus is in any position other than the DEVELOP/REWIND position, the contact $\overline{D}$ is closed to shunt the resistor R23. That allows a capacitor C7 to charge to the supply voltage at B2 through a circuit extending from the terminal at B2 through a resistor R24, the capacitor C7, over the contact $\overline{D}$ to ground.

In the D/R position of the apparatus, the contact $\overline{D}$ will open, and the capacitor C7 will partially discharge, over a period depending on the valve of the capacitor C7 and the values of the resistors R22 and R23 in parallel. A negative voltage component decaying in accordance with an exponential function will thus be applied to the base of the transistor Q5 over a circuit comprising a variable resistor R25 in series with a fixed resistor R26, and thence over the contact D*b* to the base of the transistor Q5.

The purpose of this circuit is to cause the motor DCM to drive the supply reel shaft at such a speed that the linear speed of the film past the processing station will be essentially constant over the processing run. It can be shown that the variations in film speed produced by the motor DCM as the film moves onto the supply reel, because of the change in radius of the film on the supply reel and other factors, can be compensated by supplying an exponentially decaying current to the motor. Thus, the components C7, R22 and R23 are selected to produce such a decaying current with a time constant matching the desired linear speed of the film. The motor DCM will rotate in response to this voltage at such a speed that the feedback voltage, supplied through the action of the switch S4 described above, will balance the decaying input voltage signal and cause the motor to operate stably at the speeds determined by the value of the voltage supplied through the resistors R25 and R26.

As noted above, it is desired to stop the motor DCM for a brief interval after a short strip of film has been moved onto the supply reel, releasing the tear-tab, in order to allow the processing composition to become available in a uniform body at the coating nozzle. This function is accomplished in the apparatus of FIG. 47 by a circuit closed over a front contact RKƒ of the relay RK, closed when the relay is energized, and contact Da, closed in the D/R state of the apparatus. When the relay RK is energized and the apparatus enters the D/R state, a positive going transition is supplied from the terminal B2 over the contacts RKƒ and Da to trigger a one-shot multivibrator OS1.

The multivibrator OS1 is selected to produce a negative output pulse having a duration of, for example, 0.4 seconds. The trailing edge of this negative output pulse is used to trigger a second one-shot multivibrator OS2, which is selected to produce a positive output pulse in response to a positive going transition applied to its input terminal. This positive pulse may also have a duration of, for example, 0.4 seconds. This pulse is applied through a resistor R21 and over a contact Db to the base of the transistor Q5.

Thus, during the interval beginning with the closure of the contacts D, and for a 0.4 second interval thereafter, the signal from the capacitor C7 will be effective to cause the motor DCM to run at constant speed, drawing the first increment of film onto the supply reel to release the tear-tab. For the next 0.4 second interval, the transistor Q5 will be cut off by the positive pulse from the multivibrator OS2, so that the motor DCM will stop, providing the desired pause in film movement to allow the processing composition to flow into position in the coating nozzle. Thereafter, the capacitor C7 will resume control and the film will be moved through the processing cycle at uniform speed.

While it will be apparent that various values of the components of the circuits described can be selected in the light of the purposes described above, typical values suitable for use in the apparatus of the invention are as follows:

| Resistors, ohms | Capacitors, μf | Diode and Transistor Types |
|---|---|---|
| R4 100 | C3 33 | Q1,Q4 MJE520 |
| R5 82K | C4 0.47 | Q2 MPS-A12 |
| R6 187K | C5,C6 0.047 | Q3,Q6 2N5172 |
| R7 1K | C7 540 | Q5 2N3644 |
| R8 10K | | D7 1N957, 6.8volts |
| R9 4.7K | | |
| R10 3.3K | | |
| R11 1K | | |
| R12 10K | | |
| R13 680 | | |
| R14 47 | | |
| R15 220 | | |
| R16 3.3K | | |
| R17 250K var. | | |
| R18 120 | | |
| R19 5.1K | | |
| R20 51K | | |
| R22 22K | | |
| R23 18K | | |
| R24 27 | | |
| R25 1M var. | | |
| R26 10K | | |

Values other than those given, such as that of the resistor R21, for example, can readily be selected by conventional design methods. Having thus described the system of the invention, its operation will next be described.

Referring to FIG. 5, it will be assumed that a cassette of film has been exposed in a camera, such that it is disposed primarily on the takeup reel 63 and located at the exposure termination point established by the first elongated sprocket hole 39 in FIG. 4. The parts of the apparatus will be in the position illusted in FIG. 5, with the terminals 58 and 59 presenting a closed circuit because the contacts 148 and 149 are bridged by the cam 136.

The film drive and projection system will be in the condition shown in FIG. 19, with the reel drive sprockets 239 and 240 retracted, and the apparatus deenergized because the contacts of the locator pin actuator switch S2 are open. The locator pin 181 will be in its retracted position. The cams shafts 200, 213, and 215 will be in the O position.

Referring to FIG. 45, the contact O will be closed, preparing a circuit for the clutch magnet CM. However, the clutch magnet will not be energized, because the power supply contacts S2 and $\overline{O}a$ are both open. The switch S1 will be closed.

Next, assume that a cassette 1 in the state described is inserted into the pocket 2. The first effects will be to depress the foot pedal 25, open the switch S1, and register the terminals 58 and 59 on the cassette 1 with the contacts 187 and 188 located on the wall 186 of the pocket 2 (FIG. 19).

Referring to FIGS. 20 and 21, when the foot pedal 25 is depressed, the yoke arms 276 will be removed from the collar 280 on the locating pin 181, allowing the locating pin to be driven by the spring 281 into the position shown in FIG. 26 in which it protrudes through the port 22 in the wall 18. As shown in FIG. 9, the pin 181 will enter the port 16 in the cassette, latching the cassette in the pocket. That prevents premature removal of the cassette with the film partially processed, or in a random position. At the same time, the pin 181 moves the post 175 downwardly to release the hook 166. That enables the catch 160 to engage the flanges on the supply reel 61. At the same time, the switch S2 closes its contacts, as shown in FIG. 26.

Referring to FIG. 45, with the switch S2 closed, its contacts supply power to the power supply 202 and also to the motor ACM, causing the shaft 197 to rotate and drive the blower fan 198 (FIG. 19). The power supply voltage B1 will now appear, causing the clutch magnet CM in FIG. 45 to be energized over the closed contact O.

The cam shaft 200 will now be driven, causing the cam shafts 213 and 215 to be driven. Referring to FIGS. 19 and 44, rotation of the shaft 215 will cause the cams 218 to begin to rotate from their O position toward their P position. The spindle plate 219 will now move towards the wall 18, and the plate 219 will pass over the stop 223 in its lower position as seen in FIG. 35. When the plate 219 has passed over the stop 223, the cam 377 will close the cassette sense enable switch CS, as shown in FIG. 44, preparing the cassette sense enabling circuit for the energizing of the relay RK as seen in FIG. 45. Since the terminals 58 and 59 on the cassette 1 are bridged at this time by the valve within the cassette, the relay RK will be energized, and close its stick circuit over its own front contact *a* and the contact $\overline{Ob}$, which is now closed because the cam 380 in FIG. 44 has moved away from the O position toward the P position.

With the relay RK energized, the solenoids SL1 and SL2 will now be energized. Referring to FIGS. 33–36, energizing the solenoid SL1 will cause the hinged end plate 327 of the cassette eject enabling assembly to be moved back away from the slot 336, to prevent premature ejection of the cassette 1 by the cam 337. At the same time, the cam follower 342 will be encountered by the plate 330, raising the stop 223 into position to prevent movement of the spindle plate 219 back out of engagement.

Referring to FIG. 25, energization of the solenoid SL2 will retract the latching pin 288 from the lever 285, to enable the locator pin withdrawal assembly. As shown in FIG. 24, the cam 291 will not effect any movement of the levers 285 and 286 during this rotation from the position O to the position P.

As the spindle plate 219 completes its movement toward the wall 18 in FIG. 19, the drive sprockets 240 and 239 will engage the corresponding takeup reel drive sprocket and supply reel drive sprocket 65 and 53 in FIG. 5 of the cassette. This connection is established just before the raising of the stop 223 as described above, so that engagement of the drive sprockets will be maintained by the stop 223 during the sequence of operations to follow regardless of the positions of the cams 218.

Referring to FIGS. 19 and 44, as the cam shaft reaches the P position, the snubber stop cam 235 will drive the snubber stop 236 into engagement with the snubber hub 82 of the snubber roll 62, as seen in FIG. 5. Referring to FIG. 45, with the apparatus in its P position, contact P*b* will be closed, causing the solenoid SL3 to be energized and engaging the pulleys 386 and 387 with the belt 388 to drive the film advance pawl 371 and to operate the shutter 9. The projection lamp K will not be energized at this time, however, because its energizing circuit is open at the open back contact *c* of the relay RK.

Referring to FIGS. 44 and 47, the motor reverse contacts MR will be moved by the cam 234 into their upper position, causing the motor DCM to drive the film takeup reel through the shaft 258, gears 260, 263, shaft 261, clutch 265, clutch 256, shaft 254, and drive sprocket 240 in FIG. 19.

The motor control circuit will extend from the supply terminal at B2 in FIG. 47 through the resistor R15, variable resistor R17, and contact P*d* to the base of the transistor Q5. That will cause conduction of the transistors Q5, Q6 and Q4, to allow the flow of energizing current for the motor DCM. The film will now be advanced from the termination point established by the sprocket hole 39 in FIG. 4 to the point established by the second elongated sprocket hole 40 in FIG. 4. Referring to FIG. 43, when that point is reached, the pawls 369 and 370 will skip through the elongated sprocket hole 40 without engagement with the film, and the takeup reel will stop.

During the advance movement of the film onto the takeup reel just described, the hook 43 on the film 26 will engage the end 119 on the pressure pad 86, moving the pressure pad into coating relation with the nozzle 85 as described above and illustrated in FIG. 11. During the same interval, reference to FIG. 46, the contacts of the switch S5 repeatedly close and open to cause charging and discharging of the capacitor C4, keeping the transistor Q3 conducting and preventing the capacitor C3 from charging.

When the elongated sprocket hole 40 on the film is encountered, the shaft 256 in FIG. 19 will stop, because frictional engagement of the film with the snubber roll is no longer relieved by the drive pawl, and the shaft 256 will be unable to drive the takeup reel against this load. Accordingly, the switch S5 will cease to be opened and closed. Referring to FIG. 46, that will cause the transistor Q3 to be cut off, and the capacitor C3 will begin to charge through the three second time constant circuit established over the closed contact P*c*, and extending through the resistor R5 and R4. This time interval is provided in order to prevent false operation of the motion detector before the next phase of operation should be begun. At the end of the three second time interval, the transistor Q2 will be gated into conduction, energizing the clutch magnet CM as seen in FIG. 45. The shaft 200 and its associated shafts will be driven to the next dwell position. Referring to FIG. 44, the cams will now begin to move from the P position towards the D/R position.

Referring to FIGS. 44 and 45, as the cams move away from their P position, the P contacts will open and the solenoid SL3 will be deenergized. That will disengage the shaft 197 from the shaft 197*a*, and the pawl and shutter will cease to operate.

The cam 382 will close the OFF contact O between the P and D/R positions. The contact O will maintain a circuit for the clutch magnet CM until the apparatus nears its D/R position.

As shown in FIGS. 44 and 46, the reset contact JR will be closed between the P and D/R positions. The contact JR will complete a circuit to bias the base of the transistor Q3 forward with respect to the emitter. The capacitor C3 will discharge through the collector-emitter path of the transistor Q3 and the resistor R4, preparing the motion detector circuit 395 for the next cycle of operation.

Referring again to FIG. 44, the motor reversing contacts MR will now be changed to the other position, preparing the DC motor to be driven towards the supply reel. As the cams move away from the P position, the snubber stop 236 will be retracted. The blinder cams 230 and 365 will move the associated lamp house and aperture plate blinders towards their positions closing the light apertures in the pocket 2, so that the film in the cassette will now be in a lighttight environment. The pressure plate cam 356 will be operated to raise the pressure plate, by the mechanism shown in FIG. 38.

Referring to FIG. 47, when the apparatus reaches its D position, contact $\overline{D}$ will be opened, and the capacitor C7 will begin to discharge. Contact D*b* will close, and the motor DCM will begin to operate in response to the time decaying signal supplied through the resistors R25 and R26, balanced by the motor shaft speed feedback signal supplied by the switch S4 and introduced through the resistors R19 and R20. The multivibrator OS1 will be triggered by the closing of the contact D*a*.

Referring to FIG. 19, the DC motor will now drive the supply reel shaft through the shafts 262, the clutches 267 and 255, and the shaft 250 and sprocket 239. The film will begin to advance onto the supply reel, causing the takeup reel to rotate and thereby driving the shaft 254 through the sprocket 240. That will cause the switch S5 to open and close, as before. For the 0.4 seconds interval during which the multivibrator OS1 produces its output pulse, the motor DCM will continue to drive, advancing film onto the supply reel and causing the tear-tab release mechanism described above in connection with FIGS. 5 and 7 to be actuated to strip the tear-tab in part from the initially sealed receptacle of processing fluid.

At the end of the pulse produced by the multivibrator OS1, the multivibrator OS2 will be triggered to stop the motor DCM for a 0.4 second interval. During that interval, the switch S5 will not function. However, because there is a minimum ten second delay before the capacitor C3 can be charged sufficiently to gate the transistor Q2 into conduction, the motion detector in FIG. 46 will not produce an output current sink for the clutch magnet CM.

At the end of the 0.4 second interval, the motor DCM will begin to turn again at the constant linear speed established by the decaying signal supplied by the capacitor C7. Processing of the film will occur as described above. The switch S5 in FIG. 46 will now function normally, preventing charging of the capacitor C3 by keeping the transistor Q3 in conduction.

When the end of the film is reached, the takeup reel will stop rotating, and the shaft 254 in FIG. 19 will accordingly stop. That will stop the rotation of the vanes 257, and the switch S5 will no longer be opened and closed. Referring to FIG. 46, the transistor Q3 will now be cut off, and the capacitor C3 will charge through the ten second time interval established by the resistors R6 and R4, together with the capacitor C3. That longer time interval is provided to allow for at least a ten second development of the portion of the film last coated prior to projection.

At the end of the 10 second interval, the transistor Q2 will conduct, energizing the clutch magnet CM in FIG. 45 and driving the cam shafts from their D/R position toward their O position. Referring to FIG. 44, the contact O will be reengaged, to keep the clutch magnet energized during the shaft movement of the O position.

The pressure plate lifter cam 356 will move into a position in which the pressure plate in the cassette is again lowered into engagement with the film. The blinder cams 230 and 365 will be actuated to open the light ports into the pocket 2.

The spindle cams 218 will begin to move back from the spindle plate 219 in FIG. 19. When that occurs, with the stop 223 in its raised position as shown in FIG. 33, the stop 223 will be held frictionally in its upward position, preventing the spindle plate 219 from being retracted as the cams are retracted.

During most of the motion of the cam shaft from its D/R position to its O position, the contacts $\overline{O}$ remain closed by the cam 380 in FIG. 44. That maintaines the relay RK in FIG. 45 energized, and keeps the solenoids SL1 and SL2 energized.

When the cam shaft reaches its O position, the contacts $\overline{O}$ will be opened, and the relay RK will be released. That will cause the solenoids SL1 and SL2 to be deenergized, the hinged plate 327 will move back over the slot 236, as it can do with the cam 337 in the neighborhood of its O position, so that the cam 337 will be enabled to eject the cassette as it next approaches its O position.

Referring to FIG. 25, when the solenoid SL2 is deenergized, the pin 288 will extended into the link 285, enabling the locating pin withdrawing mechanism. Between the positions D/R and O, the jam reset contact JR will be closed, causing the capacitor C3 in FIG. 46 to be discharged as described above.

When the apparatus reaches its O position, the clutch magnet CM will remain energized over contact O (FIG. 45). Accordingly, the cam shaft will continue to rotate to carry the apparatus to its P position. As it does so, the spindle cams 218 will again engage the spindle plate 219 in FIG. 19, and that action will relax the frictional engagement between the stop 223 and the spindle plate 219 and allow the stop 223 to fall below the stop 344 formed on the plate 219, as seen in FIG. 35.

At this point, the apparatus is in the condition that it would be in had a cassette of previously processed film had been inserted in the pocket 2. Accordingly, the following description applies both to the sequence of operations that occur when a cassette of unprocessed film is inserted, after it has been processed, and to the insertion of a cassette of processed film.

As the apparatus reaches its P position, with the relay RK in FIG. 45 deenergized, contact Pa will be closed to energize the projection lamp K. Contact Pb will be closed to energize the solenoid SL3, causing the film drive pawl 371 to be actuated and the shutter 9 to be opened and closed synchronously therewith.

Referring to FIG. 47, the DC motor control circuit will now supply a signal requesting the motor DCM to drive the takeup reel slowly in the direction to advance film onto the takeup reel. The signal will be supplied to the base of the transistor Q5 over the contact Pd.

The processed images on the film 26 will now be projected on the screen 5 as seen in FIG. 1. For 8 mm film having approximately 50 feet of processed images, that operation may occupy, for examply, approximately 3 minutes and 20 seconds.

The projection cycle will continue until the second elongated sprocket hole 40 on the film 26 is reached, whereupon the takeup spool drive shaft 254 in FIG. 19 will stop. The motion detector of FIG. 46 will now function to begin charging the capacitor C3 over the three second time interval established by the closed contact Pc. At the end of that interval, the clutch magnet CM will again be energized, driving the apparatus towards its D/R position. The blinders for the light apertures in the pocket 2 will again be closed, but that operation will not be significant because the film has already been processed.

When the apparatus reaches its D/R position, the closure of contact Db in FIG. 47, with the relay RK deenergized and its back contact RKg closed, will complete the rapid rewind circuit for the transistor Q5, causing the motor DCM to rewind the film rapidly onto the supply reel. That operation may occupy, for examply, about 10 seconds. At the end of rewind, the motion detector of FIG. 46 will again respond, with a three second time delay produced over the closed back contact RKd of the relay RK, to reenergize the clutch magnet CM and drive the apparatus back towards its O position.

Referring to FIG. 25, the pivot pin 288 has been reengaged with the lever 285. Accordingly, as the apparatus nears its O position, the locator pin 181 will be withdrawn as shown in FIG. 28.

Prior to the withdrawal of the locator pin, the cams 218 in FIG. 19 allow the spindle plate 219 to be moved back away from the wall 218, withdrawing the drive sprockets 239 and 240 from the cassette. Following the withdrawal of the locator pin, the ejector cam 337 will rise into the position shown in FIG. 35, ejecting the cassette 1 through the intermediate plate 327 to a position raised slightly out of the pocket 2 in the housing 3, where it can conveniently be grasped for withdrawal by the operator.

When the locator pin is withdrawn, the contacts of the switch S2 are opened. Referring to FIG. 45, that action does not immediately disable the power supply, because the contact $\overline{O}a$ remains closed until the apparatus reaches its OFF position. When it does reach that position, the contact $\overline{O}a$ opens, restoring the apparatus to its initial condition in which it is in readiness for the insertion of another cassette.

It will be apparent that had a cassette containing previously processed film been inserted in the pocket 2, the terminals 58 and 59 would not initially be bridged. Accordingly, the relay RK would not be picked up. The apparatus would thus move from its O position to its P position in the manner described above, following the processing of unprocessed film. Operation would then continue in the manner described above, up to and including the ejection of the cassette and the restoration of the film drive and projection system to its standby condition.

While the invention has been described with respect to the specific details of a particular embodiment thereof, many changes and variations will occur to those skilled in the art upon reading the foregoing description. Such can obviously be made without departing from the scope of the invention.

Having thus described the invention, what is claimed is:

1. A method of operating a film handling cassette including a strip of film to effect film exposure, processing and viewing operations, said cassette further including a substantially opaque housing, access means for sequentially facilitating the direction of image-carrying light rays onto a first side of an incremental section of said strip and for facilitating the direction of a beam of light through an incremental section of said strip outwardly of said first side thereof, a normally inoperative processing station wherein an incremental section of said strip may be treated after exposure thereof to develop viewable images thereon, said processing station requiring at least two functions to render it completely operative, said strip being initially substantially entirely stored at a first position within said housing and extending therefrom through said processing station and said access means to a second position within said housing, first and second ends of said strip being respectively permanently positioned at said first and second positions whereby an intermediate section of given length of said strip may be advanced from said first position across said processing station towards said second position, at least a portion of said section stored at said first position initially bearing latent images and disposed to traverse said access means when said intermediate section is advanced through said processing station, said method comprising the steps of:

advancing at least a segment of said film strip across said access means towards said first position while performing a first of said functions required to render said processing station operative;

performing the second of said functions required to render said processing station operative while progressively advancing said film strip towards said second position to effect the processing treatment of substantially the entire length of said film strip to develop viewable images thereon;

directing a beam of light towards said access means; and progressively advancing at least the length of said strip containing said viewable images across said access means towards said first position to facilitate the viewing of said viewable images.

2. The method of claim 1 wherein said cassette additionally includes means for releasably storing a quantity of processing fluid, and said processing station includes means for receiving said fluid when it is released from said storing means and applying said fluid to an incremental section of said strip and one of said functions required to render said processing station operative includes the step of releasing said processing fluid from said storing means and said method additionally includes the step of advancing at least a portion of said strip intermediate its said first end and its said photosensitive portion towards said first position before said fluid contacts said film strip.

3. The method of claim 2 wherein the advancement of said strip towards its said first position is temporarily discontinued when said processing fluid is released from said storing means to permit said fluid to reach said strip.

4. The method of operating a film handling cassette including a strip of material to effect film exposure, processing and viewing operations, said cassette further including a substantially opaque housing, access means for sequentially facilitating image-carrying light rays being directed onto a first side of an incremental section of said strip of material and for facilitating a beam of light being directed onto an incremental section of said strip of material outwardly of said first side thereof, means for releasably storing a quantity of processing fluid and a normally inoperative processing station including means for receiving said fluid when it is released from said storing means and applying said fluid to an incremental section of said strip of material after exposure thereof to develop viewable images thereon, said strip of material being initially substantially entirely stored at a first position within said housing and extending therefrom through said processing station and said access means to a second position within said housing, first and second ends of said strip of material being respectively permanently positioned at said first and second positions whereby an intermediate section of a given length of said strip of material may be advanced from said first position across said processing station towards said second position, at least a portion of said intermediate section initially being formed of an unexposed photosensitive material and disposed to traverse said access means when said intermediate section is advanced through said processing station, said method comprising the steps of:

directing image-carrying light rays through said access means;

simultaneously advancing at least a segment of said photosensitive portion of said strip of material across said access means towards said second position;

progressively advancing a portion of said intermediate section of said strip of material towards said first position, releasing said fluid from said storing means and temporarily discontinuing the advancement of said intermediate section towards said first position to permit said fluid to reach said strip of material;

progressively advancing the remaining segment of said intermediate section of said strip of material towards said first position whereby viewable images are formed thereon;

directing a beam of light towards said access means; and progressively advancing at least the length of said strip of material containing said viewable images across said access means towards said second position to facilitate the viewing of said viewable images.

5. The method of operating a film handling cassette including a strip of material to effect film exposure, processing and viewing operations, said cassette further including a substantially opaque housing, access means for sequentially facilitating image-carrying light rays being directed onto a first side of an incremental section of said strip of material and for facilitating a beam of light being directed onto an incremental section of said strip of material outwardly of said first side thereof, means for releasably storing a quantity of processing fluid and a normally inoperative processing station including means for receiving said fluid when it is released from said storing means and applying said fluid to an incremental section of said strip of material after exposure thereof to develop viewable images thereon, said strip of material being initially substantially entirely stored at a first position within said housing and extending therefrom through said processing station and said access means, at least a portion of said strip of material initially being formed of an unexposed photosensitive material, said method comprising the steps of:

directing image-carrying light rays through said access means;

simultaneously advancing at least a segment of said photosensitive portion of said strip of material in a given direction across said access means;

progressively advancing at least a portion of said strip of material across said access means, releasing said fluid from said storing means and temporarily discontinuing any advancement of said strip of material to permit said fluid to reach said strip of material;

progressively advancing at least the exposed photosensitive portion of said strip of material across said processing station whereby viewable images are formed thereon;

directing a beam of light towards said access means; and progressively advancing at least the length of said strip of material continuing said viewable images across said access means to facilitate the viewing of said viewable images.

6. The method of operating a film handling cassette containing a strip of film comprising at least an exposed portion bearing latent photographic images and disposed on film transport means operable to move the film in first and second opposite directions through an exposure and projection station and through a processing station engageable with the film and containing a supply of processing composition sufficient to process the entire portion of the film strip exposable at the exposure and projection station, the latent images on the film strip having been formed while operating the film transport means to advance the film strip through the exposure and projection station in said first direction, comprising the steps of placing the cassette in a projection having a normally deenergized projection light source, operating the film transport means to advance the film an additional increment in said first direction while engaging said processing means until at least the entire length of said exposable portion of said film strip has been advanced through said processing station, operating the film transport means to return the film in said second direction while applying said processing composition to at least said entire exposable portion of the film, operating the film transport means to advance the film through the exposure and projection station while energizing the projection light source and projecting images framed on the film, and operating the film transport means to return the film in said second direction until at least said entire exposable portion has been moved in said second direction through the exposure and projection station.

7. The method of operating a film handling cassette containing a strip of film comprising an exposable portion, said exposable portion comprising at least an exposed portion bearing latent photographic images, said film strip being disosed on film transport means operable to move the film in first and second opposite directions through an exposure and projection station and through a processing station engageable with the film and operable to apply processing composition to the film strip, the latent images on the film strip having been formed while operating the film transport means to advance the film strip through the exposure and projection station in said first direction, comprising the steps of placing the cassette in a projector having a normally deenergized projection light source, and operating the film transport means to advance the film an additional increment in said first direction while performing a function necessary to render said processing means operative.

8. The method of operating a film handling cassette containing a strip of film comprising an initially exposable portion including at least an exposed portion bearing latent photographic images and disposed on film transport means operable to move the film in first and second opposite directions through a processing station engageable with the film and containing a supply of processing composition sufficient to process the entire initially exposable portion of the film strip, the latent images on the film strip having been formed while operating the film transport means to advance the film strip through the processing station in said first direction, comprising the steps of placing the cassette in processing apparatus, operating the film transport means to advance the film an additional increment in said first direction until at least the entire length of said exposable portion of said film strip has been advanced through said processing station, and operating the film transport means to return the film in said second direction while applying substantially all of said processing composition to said entire initially exposable portion of the film.

9. The method of operating a film handling cassette containing a strip of film disposed on film transport means operable to move the film past a processing station comprising a container of processing composition and film coating means operable when supplied with processing composition to coat the film with the composition, comprising the steps of operating the film transport means to move a first increment of the film past the processing station while opening the container, stopping the film when the container is opened for an interval sufficient to allow the composition to reach the coating means, and then operating the film transport means to move the film past the processing station while the processing composition is applied to the film by the coating means.

10. A method of operating a photographic cassette including an exposed strip of film to effect film processing and viewing operations, said cassette further including a substantially opaque housing, access means for facilitating the transmission of light rays onto an incremental section of said strip of film, a normally inoperative processing station wherein an incremental section of said strip of material may be treated after exposure thereof to develop viewable images thereon, said processing station requiring the performance of at least two functions to render it completely operative, said strip of material being initially substantially entirely stored at a first position within said housing and extending therefrom through said processing station and said access means to a second position within said housing, first and second ends of said strip of material being respectively permanently positioned at said first and second positions whereby an intermediate section of given length of said strip of material may be advanced from said first position across said processing station towards said second position, and at least a portion of said intermediate section initially being formed of unexposed film and disposed to traverse said access means when said intermediate section is advanced through said processing station, said method comprising the steps of:

directing image-carrying light rays through said access means;

simultaneously advancing at least a segment of said photosensitive portion of said strip across said access means towards said second position and terminating said advancement prior to the entire intermediate section of said strip being advanced across said processing station to facilitate film exposure operations;

progressively advancing the remaining segment of said intermediate section to perform a first of said functions required to render said processing station operative;

subsequently performing the other of said functions required to render said processing station completely operative;

progressively advancing at least said photosensitive portion of said section of said strip towards said first position to effect the processing treatment of the entire length of said photosensitive portion to facilitate the development of viewable images thereon;

directing a beam of light towards said access means; and progressively advancing at least the length of said strip containing said viewable images across said access means toward said second position to facilitate the viewing of said viewable images.

11. The method of claim 10, wherein said cassette additionally includes means for releasably storing a quantity of processing fluid and said processing station includes means for receiving said fluid when it is released from said storing means and applying said fluid to an incremental section of said strip and said second step of rendering said processing station operative includes the step of releasing said processing fluid from said storing means and said method additionally includes the step of advancing at least a portion of said strip intermediate its said first end and its said photosensitive portion towards said first position before said fluid contacts said film strip.

12. The method of claim 11 wherein the advancement of said strip towards its said second position is temporarily discontinued when said processing fluid is released from said storing means to permit said fluid to reach said strip.

13. The method of operating a film handling cassette including a strip of at least partly exposed film to effect film processsing operations, said cassette further including a substantially opaque housing, access means for sequentially facilitating image-carrying light rays being directed onto a first side of an incremental section of said strip and for facilitating a beam of light being directed onto an incremental section of said strip outwardly of said first side thereof, means for releasably storing a quantity of processing fluid and a normally inoperative processing station including means for receiving said fluid when it is released from said storing means and applying said fluid to an incremental section of said strip to develop viewable images thereon, said strip being initially substantially entirely stored at a first position within said housing and extending therefrom through said processing station and said access means to a second position within said housing, first and second ends of said strip being respectively permanently positioned at said first and second positions whereby an intermediate section of a given length of said strip may be advanced from said first position across said processing station towards said second position, at least a portion of said intermediate section initially being disposed to traverse said access means when said intermediate section is advanced through said processing station, said method comprising the steps of:

advancing a segment of said photosensitive portion of said strip across said access means towards said second position;

releasing said fluid from said storing means and temporarily discontinuing the advancement of said intermediate section towards said second position to permit said fluid to reach said strip of material; and progressively advancing the remaining segment of said intermediate section of said strip of material towards said second position whereby viewable images are formed thereon.

14. The method of claim 13 further comprising the steps of:

directing a beam of light towards said access means; and progressively advancing at least the length of said strip containing said viewable images across said access means towards said second position to facilitate the viewing of said viewable images.

* * * * *